US008860559B2

(12) United States Patent
Ichihara et al.

(10) Patent No.: US 8,860,559 B2
(45) Date of Patent: Oct. 14, 2014

(54) POWER SUPPLY DEVICE

(75) Inventors: Fumio Ichihara, Fukuoka (JP);
Shigekiyo Nosaka, Fukuoka (JP); Ryota Yukizane, Fukuoka (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 13/255,006

(22) PCT Filed: Mar. 5, 2010

(86) PCT No.: PCT/JP2010/001577
§ 371 (c)(1),
(2), (4) Date: Dec. 21, 2011

(87) PCT Pub. No.: WO2010/100951
PCT Pub. Date: Sep. 10, 2010

(65) Prior Publication Data
US 2012/0092141 A1 Apr. 19, 2012

(30) Foreign Application Priority Data

Mar. 6, 2009 (JP) ................................ 2009-052826

(51) Int. Cl.
*G08C 19/12* (2006.01)
*B60L 11/18* (2006.01)
*H04B 3/54* (2006.01)
*H04B 3/56* (2006.01)
*H02J 7/00* (2006.01)

(52) U.S. Cl.
CPC .......... *H04B 3/54* (2013.01); *H04B 2203/5491* (2013.01); *B60L 11/1838* (2013.01); *B60L 2230/16* (2013.01); *Y02T 90/128* (2013.01); *Y02T 90/163* (2013.01); *Y02B 90/2692* (2013.01); *Y02T 10/7005* (2013.01); *Y02T 10/7088* (2013.01); *Y02T 90/16* (2013.01); *H04B 3/56* (2013.01); *H02J 7/0004* (2013.01); *H04B 2203/5454* (2013.01); *Y02T 90/14* (2013.01)
USPC ....................................................... 340/12.32

(58) Field of Classification Search
USPC ................................ 340/12.28, 13.23, 12.32
See application file for complete search history.

(56) References Cited

U.S. PATENT DOCUMENTS 6,970,072 B1 11/2005 Cregg et al.
7,693,609 B2 * 4/2010 Kressner et al. .............. 700/291
(Continued)

FOREIGN PATENT DOCUMENTS

EP 1 995 109 A1 11/2008
JP 2003-244039 8/2003
(Continued)

OTHER PUBLICATIONS
International Search Report dated May 18, 2010.
(Continued)

*Primary Examiner* — Vernal Brown
(74) *Attorney, Agent, or Firm* — Seed IP Law Group PLLC

(57) ABSTRACT

There is provided a power supply apparatus capable of supplying information as a power line communication signal superimposed on a voltage of a commercial frequency, although currents of the commercial frequency are not supplied to power receiving side external equipment, and capable of supplying power to a specific external apparatus together with the power line communication signal, by controlling supply of the currents of the commercial frequency to the external apparatus. This apparatus includes at least a power receiving section that receives the supply of the power from a power line; a power line communicating section that superimposes the power line communication signal on the voltage, which is supplied to the power receiving section, and transmits the power line communication signal to the equipment; and a power supply limiting section which is installed between the power receiving section and the equipment, allows the power line communication signal to pass and limits the supply of the power to the equipment.

10 Claims, 23 Drawing Sheets

(56) References Cited

U.S. PATENT DOCUMENTS

| | | |
|---|---|---|
| 8,004,112 B2 * | 8/2011 | Koga et al. ................. 307/36 |
| 2003/0156370 A1 | 8/2003 | Yokoo |
| 2006/0023734 A1 | 2/2006 | Yanagida et al. |
| 2006/0038660 A1 | 2/2006 | Doumuki et al. |
| 2007/0120953 A1 | 5/2007 | Koga et al. |
| 2007/0202931 A1 * | 8/2007 | Lee et al. ................. 455/572 |
| 2008/0224536 A1 | 9/2008 | Yamazaki |

FOREIGN PATENT DOCUMENTS

| | | |
|---|---|---|
| JP | 2008-77267 | 4/2008 |
| JP | 2008-227885 | 9/2008 |
| JP | 2008-228022 | 9/2008 |

OTHER PUBLICATIONS

Extended European Search Report dated Aug. 26, 2014, for corresponding EP Application No. 10748550.0-1804/2405555, 8 pages.

* cited by examiner

POWER SUPPLY DEVICE

TECHNICAL FIELD

The present invention relates to a power supply apparatus.

BACKGROUND ART

In recent years, popularization of electric vehicles is greatly expected, for countermeasures against global warming. The electric vehicles are required to be charged even if a user is in a house or out the house. At this time, connection to a power line is made via a charging cable. However, there is a risk of an unauthorized charge in power outlets outside the indoor for making a connection to the electric vehicles. Therefore, mutual authentication is required at both sides of a power feeding side and a power charged vehicle side.

Further, in recent years, a power line communication is promoted, for transmitting data by superimposing a PLC (Power Line Communication) signal (2 to 30 MHz) having high frequency, being an information signal, on a signal having a commercial frequency (50 to 60 Hz) transmitted to a power line. For example, various information communications through charging external equipment, charging terminals, and charging cables, and various services utilizing the authentication, are expected. Meanwhile, a risk of invading into a PLC network from outside of the indoor is increased, and therefore a technique of separating and unifying a passage of signals of a power line is required.

Therefore, a technique of suppressing the passage of the signals in the power line communication is reported as follows.

For example, in the power line communication system described in (Patent document 1), a blocking filter for suppressing signals of the power line communication without interfering with transmission of power of commercial alternating currents, is provided on an indoor distribution line in each group of a power line communication system that constitutes a local area network of a plurality of groups. The blocking filter has a core formed by a magnetic material, and the signals of the electric power line communication are suppressed by passing or winding electric paths of the indoor distribution line, so that a magnetic flux is generated in the same directions in the core by a simultaneously flowing current, with these electric paths set as a travel road and a return road.

CITATION LIST

Patent Literature

PTL 1
Japanese Patent Application Laid-Open No. 2008-228022

SUMMARY OF INVENTION

Technical Problem

However, according to the conventional technique (for example, patent document 1), in the power line with a blocking filter installed therein, the power line communication signal is always blocked. Therefore, the commercial frequency signal or the power line communication signal flowing through the power line cannot be selectively passed. Accordingly, on the power feeding side, the equipment via the power line communication (for example, an external apparatus) cannot be authenticated, and power is supplied only if connecting the external apparatus to the power outlets outside the indoor, thus involving a problem that unauthorized charge cannot be prevented.

In view of the above-described problem, the present invention is provided, and an object of the present invention is to provide a power supply apparatus capable of supplying information as a power line communication signal having high frequency, which is superimposed on a voltage of a commercial power (AC 100V or AC200V), although currents of the commercial power cannot be supplied to the external power receiver side equipment. Further object of the present invention is to provide a power supply apparatus capable of supplying power to a specific external apparatus together with the power line communication signal, by controlling the supply of the current having commercial power to the external apparatus.

Solution to Problem

In order to solve the above-described problem and achieve the above-described object, the present invention provides an apparatus at least including: a power receiving section that receives supply of the power from a power line; a power line communicating section that superimposes a power line communication signal on a voltage of the power whose supply is received by the power receiving section, and transmits the power line communication signal to the equipment; and a power supply limiting section that limits supply of the power to the equipment, wherein power line communication is realized while limiting power supply.

Advantageous Effects of Invention

According to the present invention, there is provided a power supply apparatus capable of realizing a power line communication system that superimposes a power line communication signal on a power line to which a voltage of a commercial power (AC 100V or AC 200V, and 50 Hz or 60 Hz) is applied, and transmits only information without supplying power.

DESCRIPTION OF EMBODIMENTS

Figure 1:
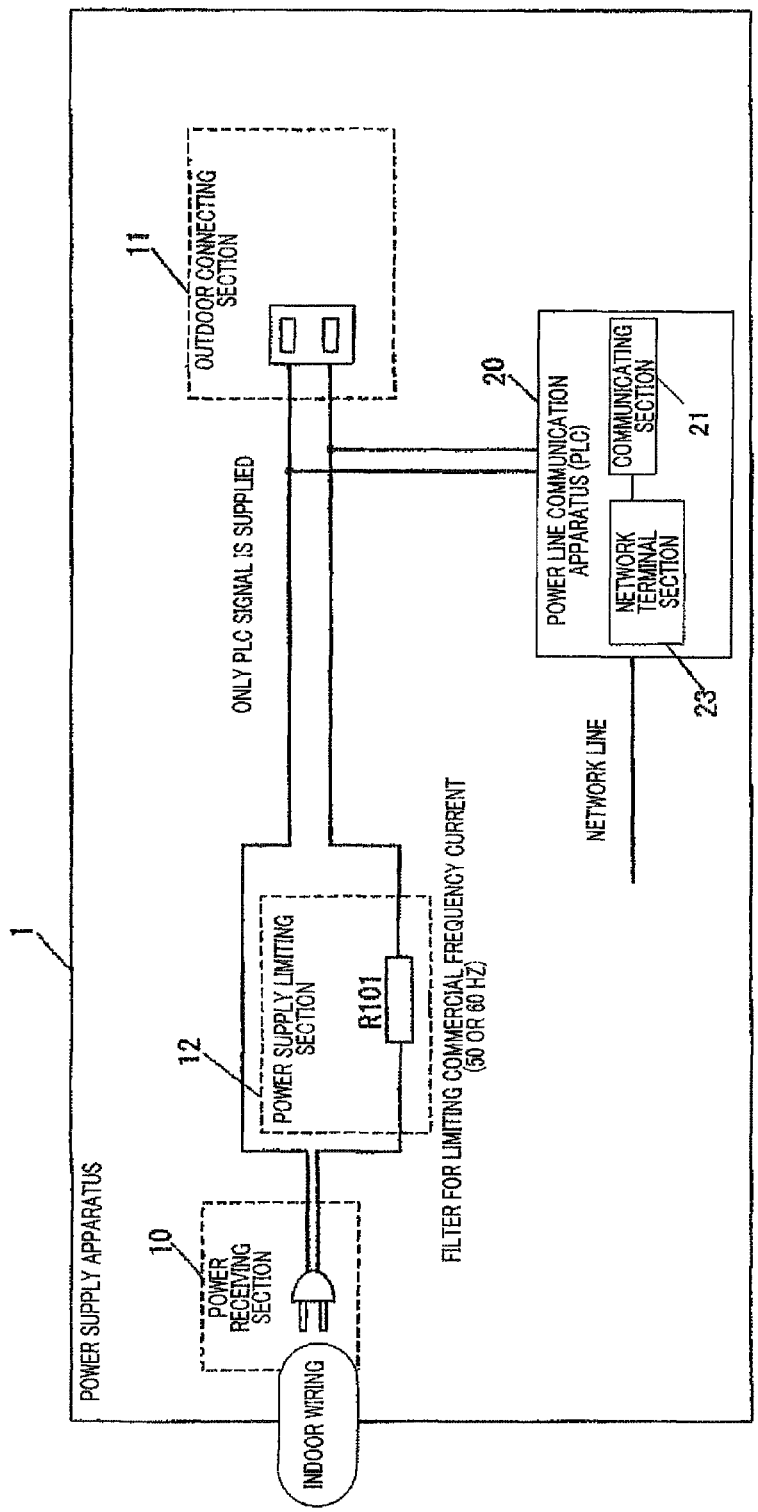
FIG. 1 is a block diagram showing an example of a power supply apparatus according to embodiment 1.

A first power supply apparatus supplies power to an equipment, and includes: a power receiving section that receives supply of power from an indoor power line; a power line communicating section that superimposes a power fine communication signal on a voltage of the power, which is supplied to the power receiving section, and transmits the power line communication signal to the equipment; and a power supply limiting section which is installed between the power receiving section and the equipment, allows the power line communication signal to pass and limits the supply of the power to the equipment. With this structure, there is an effect that a power line communication (PLC) system for transmitting only information without supplying power, can be realized.

Specifically, the power supply limiting section such as a fixed resistance that blocks passage of currents of the power, is provided between the equipment and the power receiving section such as a power plug (or a terminal table) connected to the indoor power line, and the power line communication signal (PLC signal) is superimposed on a voltage of the power by the power line communicating section, the power passing through the power line between the power plug and the equipment. Thus, there is an effect that power outlets, being power supply terminals, output an alternating voltage and the PLC signal, although it does not output power because currents of the commercial power are not supplied, thus making it possible to realize the power line communication. Further, the first power supply apparatus includes the power supply limiting section such as a filter (for example, a high-pass filter) having large output impedance such as not extracting the power of a power feeder, and the power line communicating section that superimposes the power line communication signal having high frequency, on output of the power feeder. Thus, there is an effect that the power feeder capable of supplying only information through the power line without supplying power can be realized. Thus, there is an effect that an information terminal (for example a PLC information stand, hot spot), etc., can be constructed, to which information is provided through the power line communication in the cities without supplying power if so desired.

A second power supply apparatus further includes a signal bypass section in the power supply apparatus of the aforementioned invention, wherein the signal bypass section is connected between the power receiving section and the equipment in parallel to the power supply limiting section, so that currents of the power is limited and the power line communication signal is allowed to pass. With this structure, there is an effect that only power supply can be limited without attenuating the power line communication signal, and the power line communicating section can be freely provided in either side of the power receiving side and the equipment side of the power supply limiting section.

Specifically, for example, there is an effect that the power line communication signal in a high frequency band is passed while limiting power supply so that communication using the power line communication is enabled, by connecting the signal bypass section such as a capacitor having larger impedance relative to commercial frequency (50 Hz and 60 Hz) and lower impedance relative to frequency of 2 MHz or more used for the power line communication, in parallel to the power supply limiting section.

A third power supply apparatus further includes a power supply section in the aforementioned power supply apparatus of the invention, wherein the power supply section is connected between the power receiving section and the equipment in parallel to the power supply limiting section, and the power supply section further includes a power supplying section that selectively passes the power, and further includes a control section that controls passage of the power by the power supplying section. With this structure, there is an effect that the power supply limiting section can be invalid as needed.

Specifically, for example, the power supplying section such as a relay is provided in parallel to the power supply limiting section. Thus, there is an effect that if supply of the power is needed, a switch for controlling the relay is turned-on, to thereby make a power limiting function invalid so that power can be supplied.

A fourth power supply apparatus further includes a connecting section in the aforementioned power supply apparatus of the invention, wherein the connecting section is connected to the equipment and supplies power to the equipment. The fourth power supply apparatus further includes a voltage detecting section that transmits to the control section a control signal that allows the power to pass by the power supplying section if reduction of both end voltages of the connecting section is detected. With this structure, there is an effect that start of a load connection can be easily detected, and notification to a manager is possible by recognizing the load connection.

Specifically, there is an effect that if a load is connected to the connecting section by providing the power supply control section, the both end voltages of the connecting section is remarkably reduced. There is also an effect that the start of the connection of the load and a connection state can be easily detected by monitoring the both end voltages of the connecting section. Further, there is also an effect that by detecting the start of the connection to an electric vehicle, etc., being the load, signals are transmitted to the control section, to thereby operate the power supplying section so that power can be supplied to the electric vehicle.

A fifth power supply apparatus further includes a storage section that stores registered information of the equipment in the aforementioned power supply apparatus of the invention, wherein the power line communicating section performs power line communication with the second power line communicating section of the equipment, and performs authentication processing whether the equipment is registered in the registered information. The fifth power supply apparatus further includes an authenticating section that transmits to the control section a control signal that allows the power to pass by the power supplying section if identification information from the second power line communicating section corresponds to the registered information. With this structure, there is an effect that if power is supplied only to a specific authenticated load, namely, if a charging cable is connected to the output of the power feeder, the power line communication signal is superimposed on the output of the power feeder, and a specific load is authenticated by the power line communication through the charging cable, so that power can be supplied (charged) to the authenticated specific load by the power supplying section. Thus, there is an effect that power can be supplied only in an authenticated period, so that a power steal preventive measure can be executed and a service can be limited to a specified user.

Specifically, for example, if not only the information by the power line communication but also the supply of power from the connecting section (for example, a power supply terminal) is received, the power line communication is carried out between the first power line communicating section provided in the power supply apparatus and the second power line communicating section connected to the connecting section, and authentication processing is performed between the second power line communicating section and the registered information previously stored inside or outside the first power line communicating section, and if identification information from the second power line communicating section corresponds to the registered information, the power supply limiting section is set to be invalid. Thus, there is an effect that power can be supplied only to a previously registered power supply destination.

A sixth power supply apparatus further includes a voltage detecting section in the aforementioned power supply apparatus of the invention, wherein the voltage detecting section transmits the control signal to the control section if the reduction of the both end voltages of the connecting section is detected, and the control section further includes a timer section that allows the power to pass by the power supplying section for a prescribed time, if the control signal is received from the voltage detecting section. With this structure, there is an effect that power can be supplied in a period from start of connection up to establishment of the authentication, so that the power line communicating section can be operated.

Specifically, there is an effect that if the charging cable is connected to the output of the power feeder and the connection of the charging cable is detected by the reduction of an inter-terminal voltage, the power line communication signal is superimposed on the output of the power feeder having large impedance such as not extracting the power of the power feeder. Then, power is supplied from the cable connection for a prescribed time, and the power line communication is carried out in this prescribed time, so that power can be intermittently supplied to an authenticated output destination from the power feeder. Namely, if the load is connected to the power supply terminal, the voltage of the power supply terminal is reduced, and connection of the equipment is detected. If the connection of the equipment is detected, the timer provided inside the power supply apparatus is started, and the power supply limiting section is set to be invalid, so that power can be supplied from the power supply terminal. There is an effect that the power is supplied for a prescribed time set by the timer, and services of supplying power and information is possible for a specified user by supplying the power for the prescribed time. Also, there is an effect that the second power line communicating section connected to the power supply terminal can be started or authenticated, and if the authentication is completed by a registered user, a service of continuously supplying the power can be carried out.

A seventh power supply apparatus in the aforementioned power supply apparatus of the invention further includes the authenticating section that transmits the control signal to the control section, if the authentication processing is executed. With this structure, there is an effect that power supply to the second power line communicating section is stopped during authentication, so that failure of the authentication can be prevented.

Specifically, for example, if the load is connected to the power supply terminal, the voltage of the power supply terminal is reduced, and the connection of the equipment is detected. If the connection of the equipment is detected, the timer provided inside the power supply apparatus is started and operated so as to set the power supply limiting section to be invalid, and power supply can be carried out from the power supply terminal. The power supply is carried out for a prescribed time set by the timer, and during this prescribed time, start and authentication is carried out to the second power line communicating section connected to the power supply terminal. However, a power source is required during authentication for operating the PLC for authentication. Therefore, time is required for the authentication, and elapse of the prescribed time is inevitable. Then, the supply of the power is stopped, which causes generation of the failure of the authentication. Therefore, there is an effect that the failure of the authentication due to cutting of power in the middle of the authentication can be prevented by continuing the power supply during the authentication processing.

An eighth power supply apparatus further includes the authenticating section in the aforementioned power supply apparatus of the invention, wherein the authenticating section transmits the control signal to the control section, if the equipment is authenticated and registered. With this structure, there is an effect that the power supply is stopped in the middle of the authentication and registration processing, so that the failure in the authentication and registration processing can be prevented.

Specifically, for example, since the registration of the second power line communicating section before the authentication and registration processing is not completed, the power supply cannot be received, and a registration operation cannot be performed either, through a communication operation with the power line communicating section in the power supply apparatus. Therefore, there is an effect that the operation of the second power line communicating section on the power receiving side is enabled and the registration operation is also enabled, by operating the power supplying section and forcibly supplying power. Namely, there is an effect that by operating the power supplying section until the authentication and registration processing is ended, cut of the power linked to the second power line communicating section which is connected to the power supply terminal and receives power supply, can be prevented in the middle of the registration processing, and the failure of the authentication and registration processing can be prevented.

According to ninth and tenth power supply apparatuses in the aforementioned power supply apparatus of the invention, if the reduction of the both end voltages of the connecting section is detected, the voltage detecting section further transmits the control signal to the control section, and if the increase of the both end voltages of the connecting section is detected, transmission of the control signal to the control section is canceled, or transmission of the control signal to the control section after elapse of the prescribed time is canceled. With this structure, there is an effect that a power saving operation is enabled.

Specifically, for example, if the load is connected to the power supply terminal, the voltage of the power supply terminal is reduced, and therefore connection of the equipment is detected by the voltage detecting section. Thus, by starting the first power line communicating section connected to the power supply terminal by starting the supply of the power, communication with the second power line communicating section is started. Therefore, there is no necessity for always supplying power, and this is economical. Further, if the increase of the both end voltages of the power supply terminal is detected by the voltage detecting section, cut of a link to the second power line communicating section is recognized. Therefore there is no necessity for always supplying power, and this is economical.

Further, cut of the network between the first power line communicating section and the second power line communicating section may be directly detected, to end the power supply.

According to an eleventh power supply apparatus in the aforementioned power supply apparatus of the invention, the control section further includes a network terminal section that receives a control signal that allows the power to pass by the power supplying section from a network apparatus which is communicably connected to the control section via the network. With this structure, there is an effect that power supply to an outdoor apparatus which is permitted to be charged, can be controlled from indoor equipment via the network.

Specifically, for example, there is an effect that by providing the network terminal section in the power supply apparatus such as a power feeder, power feed-enabled/disabled information can be transmitted from the network apparatus that exists in the network, and the power supplying section in the power supply apparatus is controlled so that power can be supplied. Further, there is an effect that by controlling the power supplying section through the network based on registered information regarding external equipment that exists in the network, and control information including the control signal, power feed can be limited only to a specified user. Further, there is an effect that by transmitting the information to the power line communicating section in the power supply apparatus via the network, and further by transmitting the information to the second power line communicating section connected to an indoor connecting section, connection of an indoor network and an outdoor network is enabled via the power line communication.

According to a twelfth power supply apparatus in the aforementioned power supply apparatus of the invention, the control section further receives the control signal that allows the power to pass by the power supplying section from the third power line communicating section which is connected to the power receiving section and the control section via the power line. With this structure, there is an effect that network wiring for an exclusive line or indoor network for a special control is not necessary by using the power line.

Specifically, for example, by providing the third power line communicating section connected to the power receiving side of the power supplying section and the control section, communication between the first power line communicating section in the power supply apparatus and the indoor-installed third power line communicating section is enabled through the power line, and communication via a new communication line (for example, network such as LAN) is not necessary. Thus, there is an effect that an economical power feeding control system can be constructed.

A thirteenth power supply apparatus in the aforementioned power supply apparatus of the invention further includes a signal bypass section connected to the power supply limiting section between the power receiving section and the equipment, wherein the third power supply apparatus further includes a signal bypass section for passing the power line communication signal, and the power receiving section further receives the control signal that allows the power to pass by the power supplying section, the signal being transmitted from the fourth power line communicating section connected to the indoor power line. With this structure, there is an effect that the network wiring for the exclusive line and the indoor network for a special control is not necessary by using the indoor power line.

Specifically, for example, there is an effect that by installing the signal bypass section for bypassing the power supply limiting section, communication with the fourth power line communicating section is enabled, which is linked to a tip of an indoor power line communication network connected to the power receiving section. Further, there is an effect that power outlets are usually installed in one of the rooms in a house, and therefore there is no necessity for installing a new network even if the power supply apparatus and the fourth power line communicating section are moved in a house, and such apparatuses can be easily moved and set in a house.

According to a fourteenth power supply apparatus in the aforementioned power supply apparatus of the invention, the connecting section is provided in an exterior wall of a building. With this structure, there is an effect that the power can be supplied only to an authenticated load (an apparatus as an example), and use of the power during absence of a user, namely while being away (for example, stealing power), and an accident due to children-caused misuse like connection of the equipment to a power source, can be prevented.

Specifically, for example, a power outlet for supplying power is sometimes provided on the exterior wall of a residential building, etc., for indoor use or business use of electrically-powered equipment, etc., outside the house. Such a power outlet is usually left in a power supplied state. However, a third person can easily use this power at night or during absence, and therefore an owner suffers an economic loss, or the equipment or a power feeding facility is broken by connecting unintended equipment thereto, or protective equipment is operated in some cases. Therefore, there is an effect that by assembling the function of the present invention into the power outlet that can be connected to the outdoor equipment, then authenticating the equipment and supplying power only to the authenticated equipment, the power is not supplied even if unauthorized use (power stealing) occurs or untended equipment is connected in a time zone at night or during absence of an owner if the owner cannot manage. Therefore, the owner does not suffer economic loss and the accident can also be prevented from occurring.

According to a fifteenth power supply apparatus in the aforementioned power supply apparatus of the invention, the connecting section is installed in the information terminal apparatus. With this structure, there is an effect that the power line communication system (PLC information stand or hotspot as an example) that transmits only information without supplying power, can be realized.

Specifically, for example, there is an effect that if information is intended to be provided to a third person, and personal information of an individual who receives the information is included in the provided information, security issues generated in a wireless portion can be avoided. Further, there is an effect that although use of the electric vehicles is promoted from a viewpoint of preventing a global warming, if a power supply service is provided to the electric vehicles, communication with no leak of information among electronic vehicles, or no damage such as wiretapping is enabled by providing an information terminal apparatus equipped with a power feeding apparatus having the function of the present invention. Further, there is an effect that further safe information communication is enabled by installing the information terminal apparatus with the power supply apparatus having an authenticating function assembled therein.

According to a sixteenth power supply apparatus in the aforementioned power supply apparatus of the invention, the equipment is an electric vehicle. With this structure, there is an effect that whether a vehicle is a charge permission vehicle can be authenticated through the charging cable, making it possible to manage and control a charging amount and construct an integrated network of an in-vehicle network and an indoor network, so that data that exists in the in-vehicle network can be transferred to the indoor network.

Specifically, for example, the power line communication is carried out between the second power line communicating section having the authenticating function, which is mounted on the electric vehicle connected to the charging outlet and a connection line, and the power line communicating section having the authenticating function in the power supply apparatus. Then, authentication with respect to the previously stored registered information is carried out, and if identification information from the second power line communicating section corresponds to the registered information, electric charge is started by setting the power supply limiting section to be invalid. Thus, there is an effect that whether the vehicle is the charge permission vehicle is authenticated, and power can be supplied only to the previously registered power supply destination through the charging cable. Further, there is an effect that by assembling the power line communicating section into the power supply apparatus for charging the electric vehicles with battery mounted thereon, authentication is performed through the charging cable, and power for electric charge can be supplied in accordance with an authentication result, and therefore power supply to a third person who steals power can be prevented. Further, there is an effect that if power supply or information supply is performed during mooring of a camping car, etc., by assembling the authenticating section of the present invention into the power supply apparatus, power can be provided only to a vehicle which is permitted to enter into a parking lot, and information can be easily exchanged via the charging cable without installing a new network cable.

Description of Embodiments

Now, embodiments of the power supply apparatus according to the present invention will be described in detail with reference to the accompanying drawings. Note that the present invention is not limited to the embodiments.

Particularly in the embodiments given hereinafter, an example of applying the present invention to power feeding, in which power is fed to electric vehicles, will be described. However, the present invention is not limited to this case, and can be similarly applied in all technical fields using equipment connected to the power line for charging.

An outline of the power supply apparatus will be described hereinafter and then a structure and processing of the power supply apparatus will be described in detail.

The power supply apparatus has the following basic characteristics. Namely, the power supply apparatus includes at least a power receiving section that receives power supply from an indoor power line; an outdoor connecting section that supplies power to outdoor external equipment; and a power supply limiting section that limits currents of a commercial power, installed between the power receiving section and the outdoor connecting section. Wherein, the "indoor power line" may be electric wiring for transmitting power to each part of a building via a distribution panel in the building from outdoor wire. Further, the power supply apparatus may further include a signal bypass section which is connected in parallel to the power supply limiting section between the power receiving section and the outdoor connecting section, and limits currents of a commercial power and allows a power line communication signal to pass. Further, the power supply apparatus may further include a power supplying section which is connected in parallel to the power supply limiting section between the power receiving section and the outdoor connecting section, and selectively allows power to pass. Further, the power supply apparatus may further include a voltage detecting section that transmits to a control section a control signal that allows the power to pass by the power supplying section, if reduction of both end voltages of the outdoor connecting section is detected. Further, the power supply apparatus may control passage of the power by the power supplying section. Further, the power supply apparatus may further include a storage section that stores registered information of external equipment, wherein power line communication is carried out with a second power line communicating section of the external equipment, and authentication processing of whether the external equipment is registered in the registered information is carried out, and if identification information from the second power line communicating section corresponds to the registered information, the control signal that allows the power to pass by the power supplying section may be transmitted to the control section. Wherein, the registered information may be MAC address, etc., of the external equipment. Further, the power supply apparatus may include a voltage detecting section that transmits the control signal to the control section if reduction of both end voltages of the outdoor connecting section is detected, and if the control signal is received from the voltage detecting section, the power may be controlled to pass by the power supplying section for a prescribed time. Further, the power supply apparatus may control the power line communicating section to transmit the control signal to the control section if an authentication processing is carried out. Further, the power supply apparatus may control the power line communicating section to transmit the control signal to the control section if the authentication processing of the external equipment is carried out. Further, if the reduction of the both end voltages of the outdoor connecting section is detected, the power supply apparatus may transmit the control signal to the control section, and if the increase of the both end voltages of the outdoor connecting section is detected, the power supply apparatus may cancel transmission of the control signal to the control section. Further, if the reduction of the both end voltages of the outdoor connecting section is detected, the power supply apparatus may transmit the control signal to the control section, and if the increase of the both end voltages of the outdoor connecting section is detected, the power supply apparatus may cancel the transmission of the control signal to the control section after elapse of a prescribed time. Further, the power supply apparatus may receive the control signal that allows the power to pass by the power supplying section from a network apparatus communicably connected to the control section via a network. Further, the power supply apparatus may receive the control signal that allows the power to pass by the power supplying section, from a third power line communicating section connected to the power receiving section and the control section via a power line. Further, the power supply apparatus may further include a signal bypass section which is connected in parallel to the power supply limiting section between the power receiving section and the outdoor connecting section, and limits currents of a commercial power and allows a power line communication signal to pass. The power supply apparatus may also receive the control signal by the power receiving section, being the control signal that allows the power to pass by the power supply section, also being the control signal transmitted from a fourth power line communicating section connected to the indoor power line. Further, the power supply apparatus may install the outdoor connecting section on an exterior wall of a building, and also may install it on an information terminal apparatus. Further, the power supply apparatus may supply power to the electric vehicles.

As described above, description of the outline of the present invention is ended.

Embodiments (embodiment 1 to embodiment 10) of the power supply apparatus will be described hereinafter, with reference to FIG. 1 to FIG. 20. Note that the present invention is not limited to these embodiments. In embodiments 1 to 10, the power line communication apparatus is called PLC modem or PLC adapter in some cases.

Note that in FIGS. 1 to 20, designation mark 1 indicates the power supply apparatus (power feeder), designation mark 10 indicates the power receiving section, designation mark 11 indicates the outdoor connecting section, designation mark 12 indicates the power supply limiting section, designation mark 13 indicates the bypass section, designation mark 14 indicates the power supplying section, designation mark 15 indicates the voltage detecting section, designation mark 20 indicates the power line communication apparatus (PLC) in the power supply apparatus, designation mark 21 indicates a communicating section of the power line communication apparatus (PLC) 20, designation mark 22 indicates an authenticating section of the power line communication apparatus (PLC) 20, designation mark 23 indicates a network terminal section of the power lien communication apparatus (PLC) 20, designation mark 30 indicates the control section, designation mark 31 indicates a timer section of the control section 30, designation mark 32 indicates the network terminal section of the control section 30, and designation mark 40 indicates the storage section (server).

Further, designation mark 50 indicates a load (battery charger), designation mark 60 indicates the second power line communication apparatus (PLC) of the external equipment, designation mark 61 indicates the communicating section of the second power line communication apparatus (PLC) 60, and designation mark 62 indicates the authenticating section of the second power line communication apparatus (PLC) 60.

Further, designation mark 70 indicates the network apparatus communicably connected to the control section 30 via the network.

Further, designation mark 80 indicates the indoor power line communication apparatus (PLC) different from the power line communication apparatus (PLC) 20, designation mark 81 indicates the communicating section of the power line communication apparatus (PLC) 80, and designation mark 82 indicates the authenticating section of the power line communication apparatus (PLC) 80.

(Embodiment 1)

First, embodiment 1 will be described hereinafter, with reference to FIG. 1 and FIG. 2.

(Structure 1)

A structure of this power supply apparatus 1 according to this embodiment will be described, with reference to FIG. 1. FIG. 1 is a block diagram showing an example of the power supply apparatus 1 according to this embodiment, conceptually showing only a portion related to the present invention. The power supply apparatus 1 is constituted by connecting power receiving section 10, connecting section (namely, outdoor connecting section 11), power supply limiting section 12, and power line communicating section 20 (namely, power line communication apparatus (PLC) 20) including the communicating section 21 and the network terminal section 23, via the power line.

In FIG. 1, power receiving section 10 receives power supply from the indoor power line (namely, indoor wiring). For example, power receiving section 10 may be an attachment plug.

Further, in FIG. 1, outdoor connecting section 11 is connected to the equipment (for example external equipment), and supplies power to the equipment. For example, outdoor connecting section 11 may be a plug connecting section for wiring (power outlet), etc.

Further, in FIG. 1, power supply limiting section 12 limits currents of the power (namely, commercial power), installed between power receiving section 10 and outdoor connecting section 11. As shown in FIG. 1, power supply limiting section 12 is constituted of fixed resistance R101, etc., and may be a filter for cutting the currents of the commercial power.

Further, in FIG. 1, power line communication apparatus (PLC) 20 is constituted by including communicating section 21. Wherein, power line communication apparatus (PLC) 20 superimposes a power line communication signal on a voltage of the commercial power, and for example, may be PLC modem or PLC adapter, etc.

Further, in (structure 1), explanation is given for an example of providing power supply limiting section 12 inside the power supply apparatus 1. However, power supply limiting section 12 can be installed at an arbitrary position, provided that it is installed between power receiving section 10 and external equipment (for example, electric vehicle, etc.) Regarding this point, the same thing can be said for the embodiments given below.

Wherein, network terminal section 23 is a communication control section that receives/transmits a communication signal including information via the network (circuit). Wherein, communicating section 21 receives/transmits the power line communication signal via power line, etc.

(Processing 1)

Figure 2:
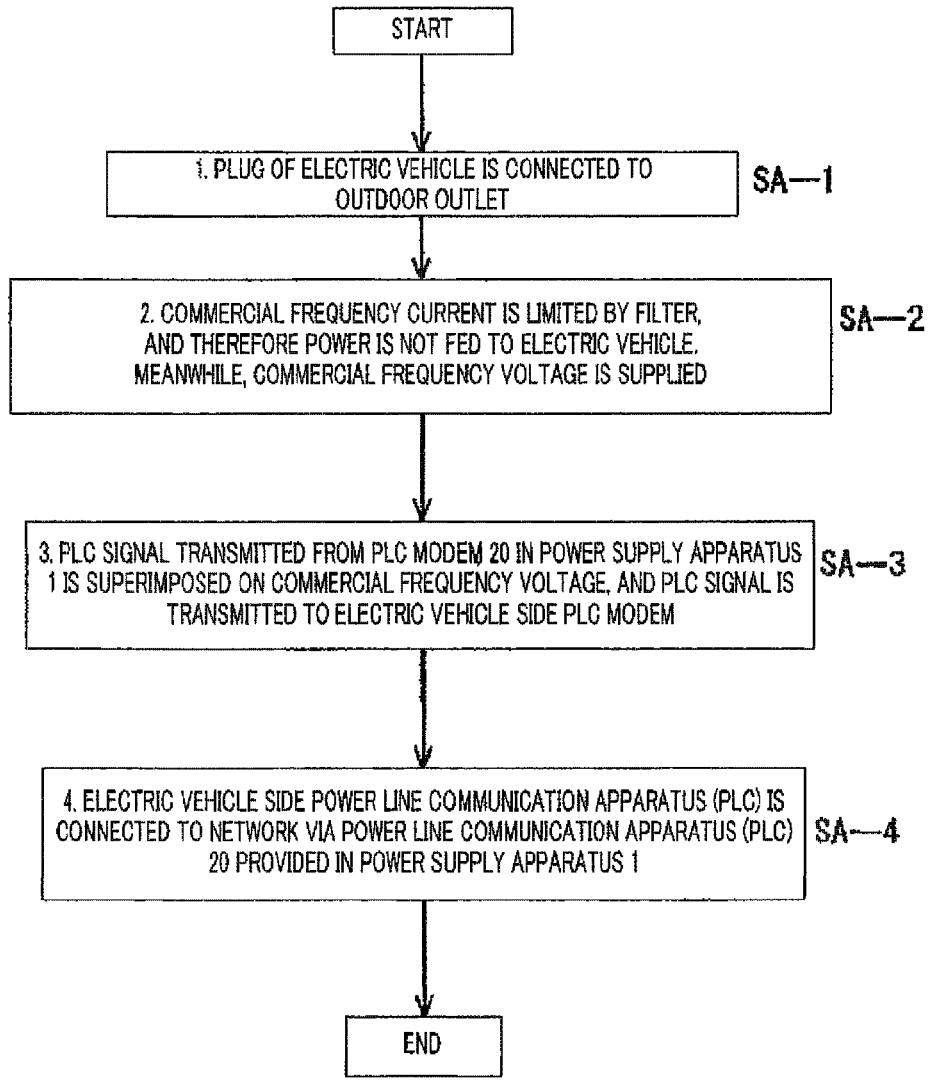
FIG. 2 is a flowchart showing an example of processing carried out by the power supply apparatus shown in FIG. 1.

FIG. 2 is a flowchart showing an example of processing performed by power supply apparatus 1 shown in FIG. 1. Note that PLC modem shown in FIG. 2 means the aforementioned power line communication apparatus.

First, a user of an electric vehicle connects a plug of the electric vehicle to the outdoor outlet (outdoor connecting section 11) that supplies power to the outdoor external equipment (step SA-1).

Then, the filter (power supply limiting section 12) is installed between power receiving section 10 and outdoor connecting section 11, and supplies the voltage of the commercial power having commercial frequency. However, power feeding to the electric vehicle is not performed by cutting the currents (namely, limitation) (step SA-2).

Then, power line communication apparatus (PLC) 20 superimposes the power line communication (PLC) signal on the voltage of the commercial power, and transmits the power line communication (PLC) signal to the electric vehicle side second power line communicating section (namely, power line communication apparatus (PLC) 60) (step SA-3).

Thus, the second power line communication apparatus (PLC) can join in the network mounted on the electric vehicle, via power line communication apparatus (PLC) 20, without supplying power (SA-4).

(Embodiment 2)

Embodiment 2 will be described next, with reference to FIG. 3 and FIG. 4.

(Structure 2)

The structure of this power supply apparatus 1 according to this embodiment will be described, with reference to FIG. 3. FIG. 3 is a block diagram showing an example of power supply apparatus 1 according to this embodiment. Power supply apparatus 1 is constituted by connecting power receiving section 10, outdoor connecting section 11, power supply limiting section 12, signal bypass section 13, and power line communication apparatus (PLC) 20 including communicating section 21, via the power line.

Note that power receiving section 10, outdoor connecting section 11, power supply limiting section 12, power line communication apparatus (PLC) 20, communicating section 21 and network terminal 23, are similar to those of the embodiment 1, and therefore explanation thereof is omitted.

Figure 3:
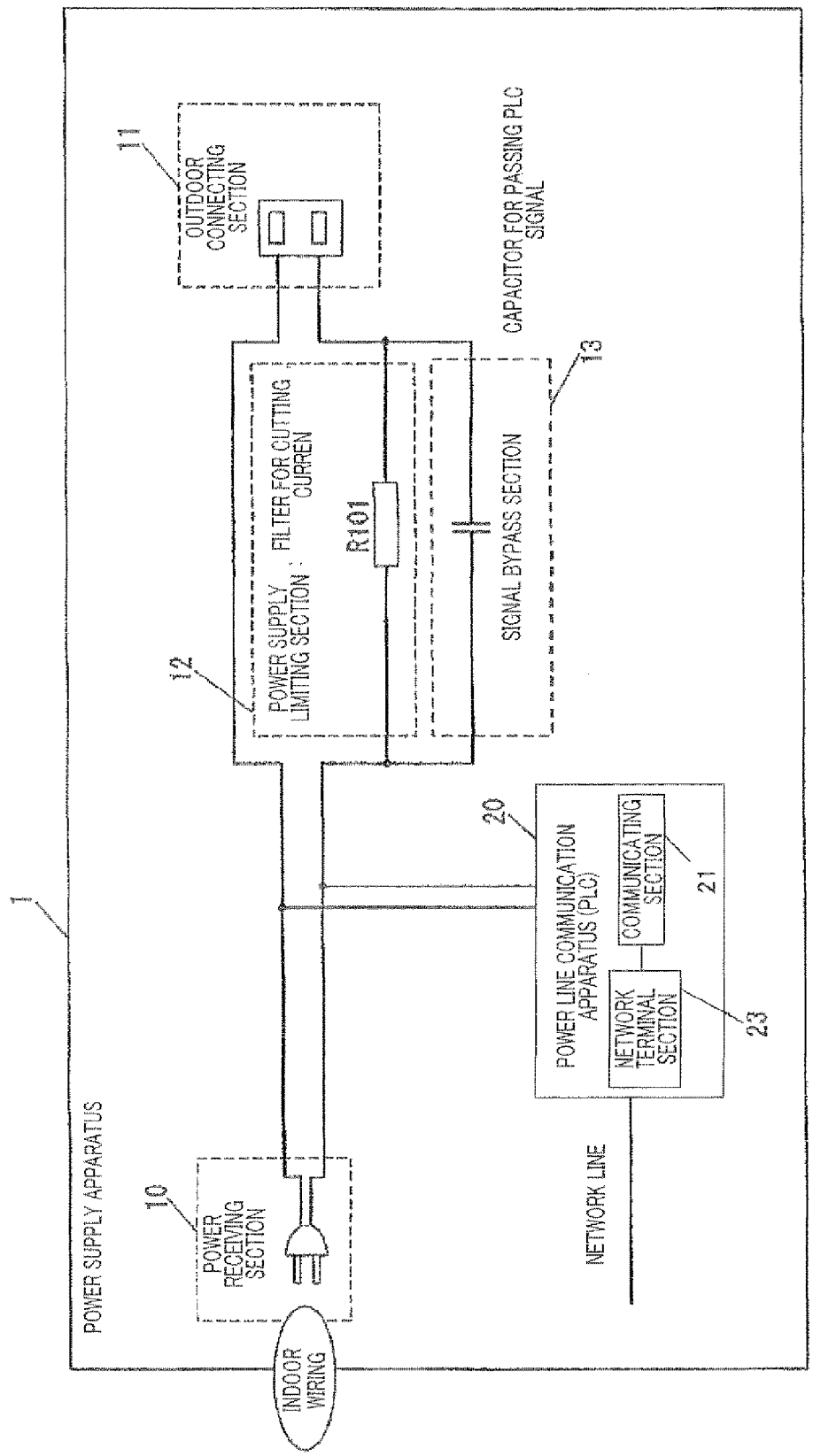
FIG. 3 is a block diagram showing an example of the power supply apparatus according to embodiment 2.

In FIG. 3, signal bypass section 13 is connected in parallel to power supply limiting section 12 between power receiving section 10 and outdoor connecting section 11, and limits currents of the commercial power, and allows the power line communication signal to pass. As shown in FIG. 3, signal bypass section 13 is constituted of a capacitor, etc., and attenuates a low frequency band, and may be a high-pass filter (HPF) for passing power through a high frequency band, and may also be a band-pass filter (BPF) for passing power through a specific frequency band used for the power line communication.

By providing signal bypass section 13, power line communication apparatus (PLC) 20 may be disposed at either side of power receiving section 10 of power supply limiting section 12, and outdoor connecting section 11. Thus, second power line communication apparatus (PLC) 60 mounted on the electric vehicle can join in the network, via power line communication apparatus (PLC) 20, without supplying power.

(Processing 2)

Figure 4:
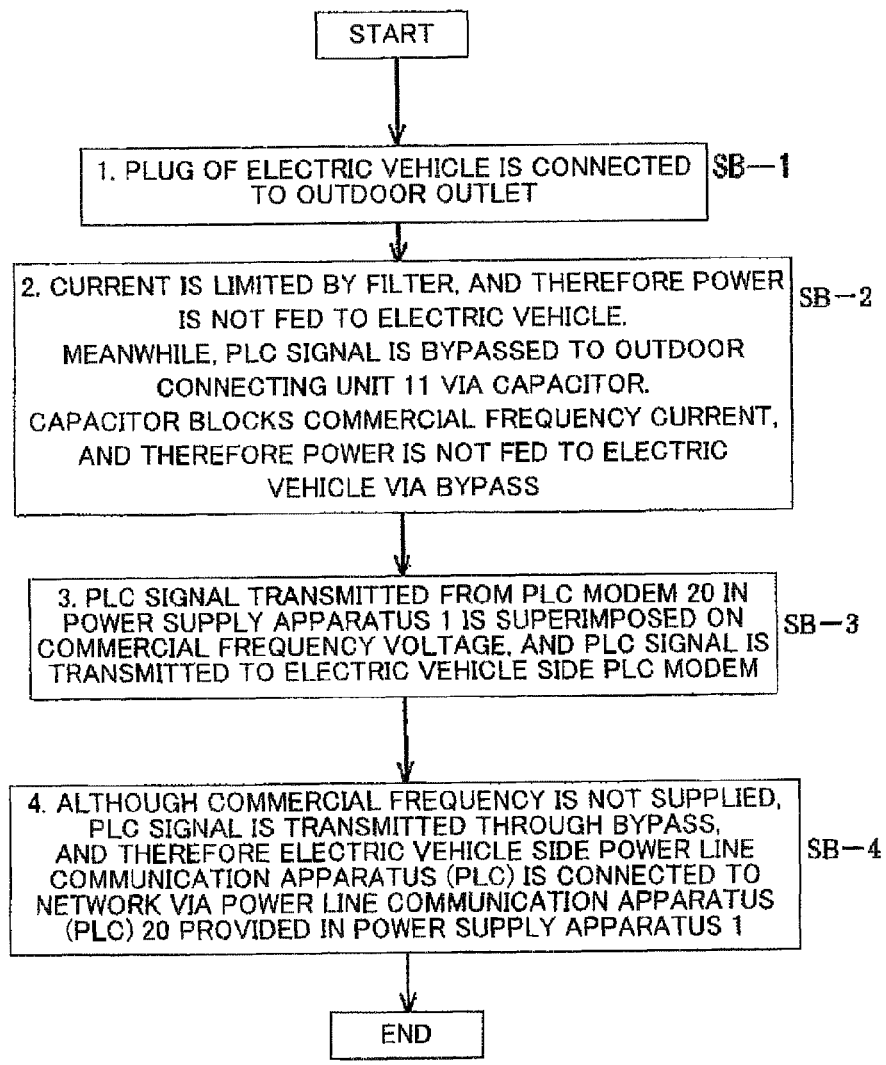
FIG. 4 is flow chart showing an example of the processing carried out by the power supply apparatus shown in FIG. 3.

FIG. 4 is a flowchart showing an example of the processing performed by power supply apparatus 1 shown in FIG. 3. Note that the PLC modem shown in FIG. 4 means the aforementioned power line communication apparatus.

Further, step SB-1, SB-3, and step SB-4 shown in FIG. 4 are same s step SA-1, step SA-3, and step SA-4 shown in FIG. 2, and therefore explanation thereof is omitted.

Next, as shown in FIG. 4, capacitor (signal bypass section 13) is connected in parallel to the filter (power supply limiting section 12) between power receiving section 10 and outdoor connecting section 11, and limits (namely, cuts) the currents of the commercial power, and bypasses the signals to outdoor connecting section 11 of the power line communication (PLC) signal which is superimposed on the voltage of the commercial power in step SB-2, to thereby pass the power line communication (PLC) signal (step SB-2).

By providing signal bypass section 13, power line communication apparatus (PLC) 20 may be disposed at either side of the power receiving section 10 of the power supply limiting section 12 and outdoor connecting section 11. Thus, the second power line communication apparatus (PLC) 60 mounted on the electric vehicle can join in the network, via the power line communication apparatus (PLC) 20, without supplying power.

(Embodiment 3)

Embodiment 3 will be described next, with reference to FIG. 5 and FIG. 6.

(Structure 3)

The structure of the power supply apparatus 1 according to this embodiment will be described, with reference to FIG. 5. FIG. 5 is a block diagram showing an example of the power supply apparatus 1 according to this embodiment, and only a portion related the present invention with aforementioned structure is conceptually described. Power supply apparatus 1 includes power receiving section 10, power supply limiting section 12, power supply section 14, power line communication apparatus (PLC) 20 provided with communicating section 21, and control section 30.

Note that power receiving section 10, outdoor connecting section 11, power supply limiting section 12, power line communication apparatus (PLC) 20, communicating section 21 is similar to those of the embodiment 1, and therefore explanation thereof is omitted.

Figure 5:
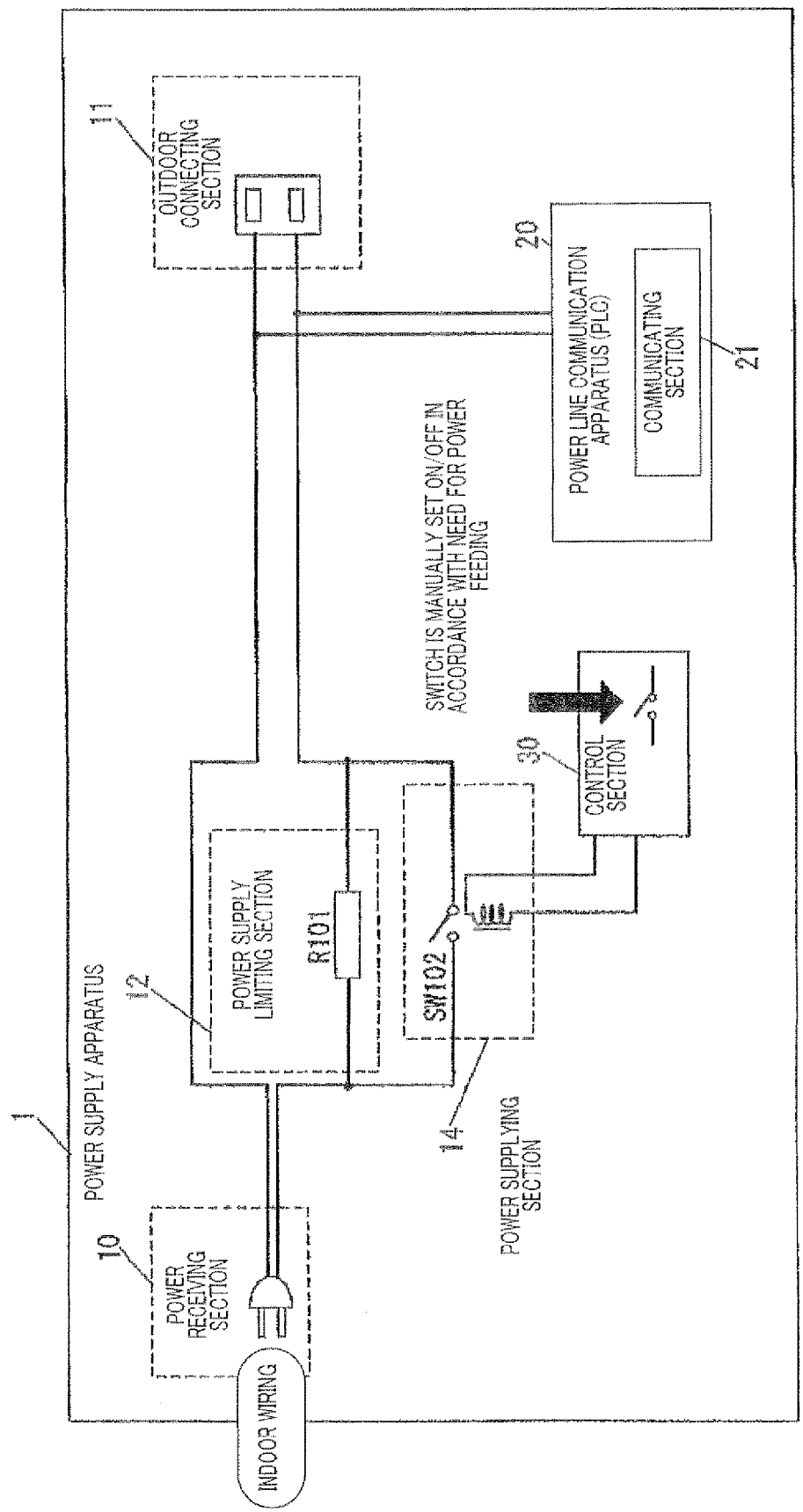
FIG. 5 is a block diagram showing an example of the power supply apparatus according to embodiment 3.

In FIG. 5, power supplying section 14 is connected in parallel to power supply limiting section 12 between power receiving section 10 and outdoor connecting section 11, and selectively allows the power to pass. As shown in FIG. 5, power supplying section 14 may be a relay, etc., constituted of a coil and switch SW 102, etc.

Further, in FIG. 5, control section 30 controls the passage of the power by power supplying section 14. Wherein, control section 30 may have a control program such as OS (Operating System), being a program defining the processing of controlling the passage of the power by the power supplying section 14, and an internal memory for storing required data, and control section 30 may perform information processing for executing the processing based on these programs. Further, as shown in FIG. 5, control section 30 may have a switch, and may control the passage of the power by the power supplying section 14.

(Processing 3)

Figure 6:
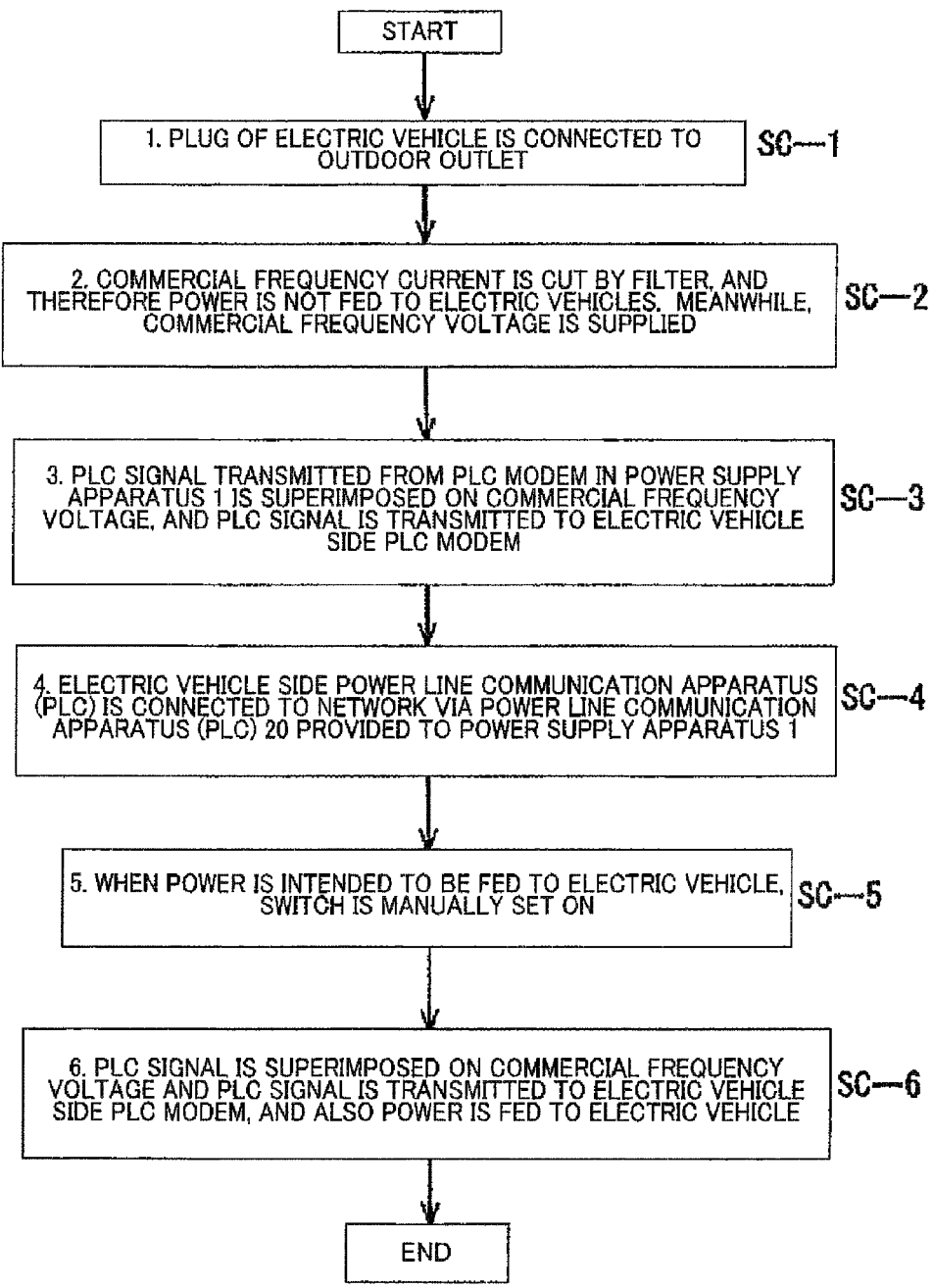
FIG. 6 is a flowchart showing an example of the processing carried out by the power supply apparatus shown in FIG. 5.

FIG. 6 is a flowchart showing an example of the processing performed by power supply apparatus 1 shown in FIG. 5. Note that the PLC modem shown in FIG. 6 means the aforementioned power line communication apparatus.

Further, step SC-1 to step SC-4 shown in FIG. 6 is the same as step SA-1 to step SA-4 shown in FIG. 2, and therefore explanation thereof is omitted.

Further, as shown in FIG. 6, if power feeding is desired to be performed to the electric vehicle, the switch for permitting the power feeding is turned-on. if the switch is turned-on manually, control section 30 allows the power to pass from power receiving section 10 to outdoor connecting section 11 by power supplying section 14 (step SC-5).

Then, outdoor connecting section 11 transmits the PLC signal superimposed on the voltage of the commercial power by power line communication apparatus (PLC) 20, to the electric vehicle side PLC modem, and also performs power feeding to the electric vehicle by transmitting the currents of the commercial power (step SC-6).

(Embodiment 4)

Embodiment 4 will be described next, with reference to FIG. 7 and FIG. 8.

(Structure 4)

Figure 7:
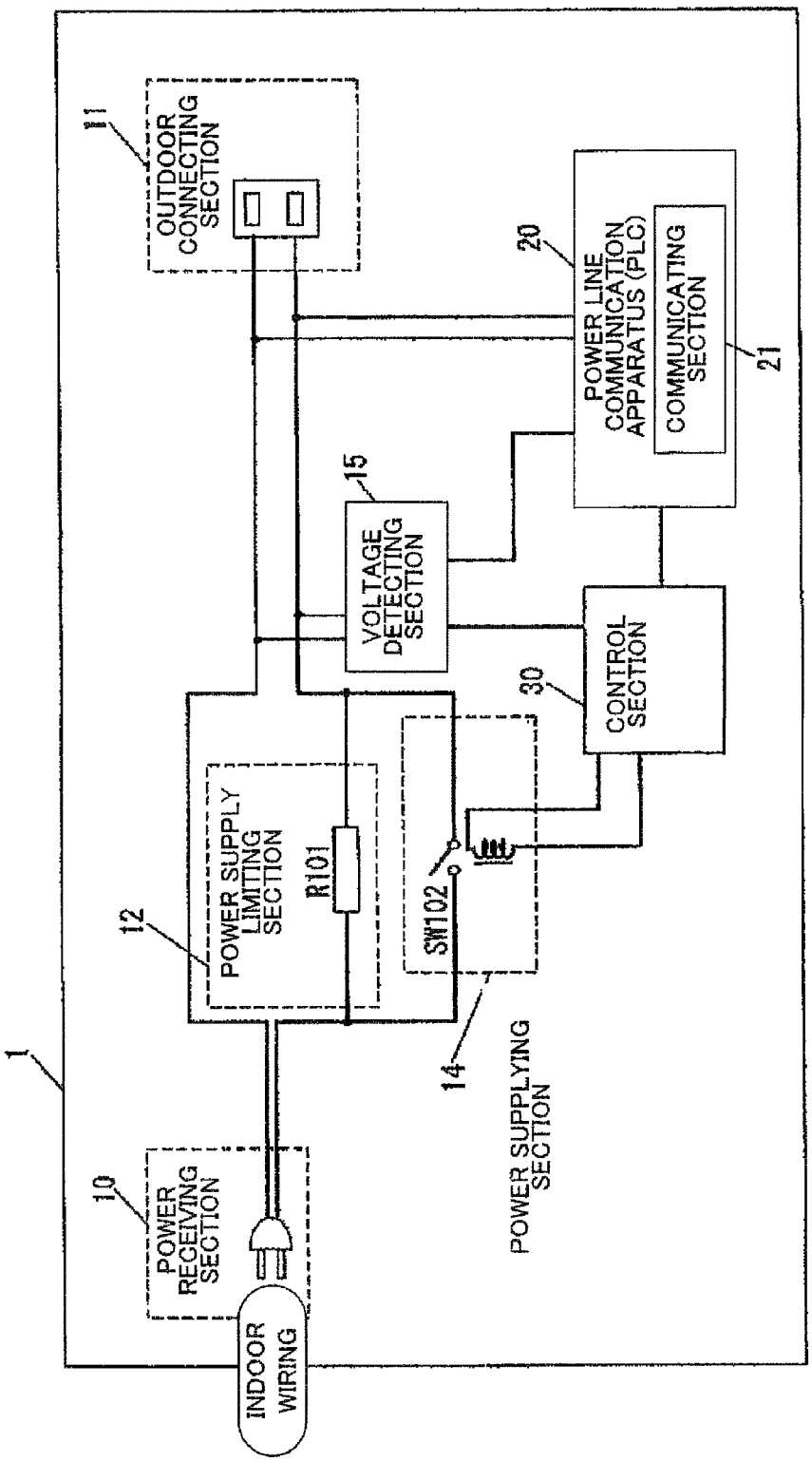
FIG. 7 is a block diagram showing an example of the power supply apparatus according to embodiment 4.

FIG. 7 is a block diagram showing an example of the power supply apparatus 1 according to this embodiment. Power supply apparatus 1 is constituted of power receiving section 10, outdoor connecting section 11, power supply limiting section 12, power supplying section 14, voltage detecting section 15, power line communication apparatus (PLC) 20 including voltage detecting section 15 and communicating section 21, and control section 30.

Note that power receiving section 10, outdoor connecting section 11, power supply limiting section 12, power supplying section 14, power line communication apparatus (PLC) 20, communicating section 21, and control section 30 are similar to those of aforementioned embodiment 3, and therefore explanation thereof is omitted.

In FIG. 7, if the reduction of the both end voltages of outdoor connecting section 11 is detected, voltage detecting section 15 outputs a signal to power line communication apparatus (PLC) 20 and control section 30m, showing that the load (equipment) is connected to outdoor connecting section 11. Wherein, voltage detecting section 15 may be a voltage detecting section.

(Processing 4)

Figure 8:
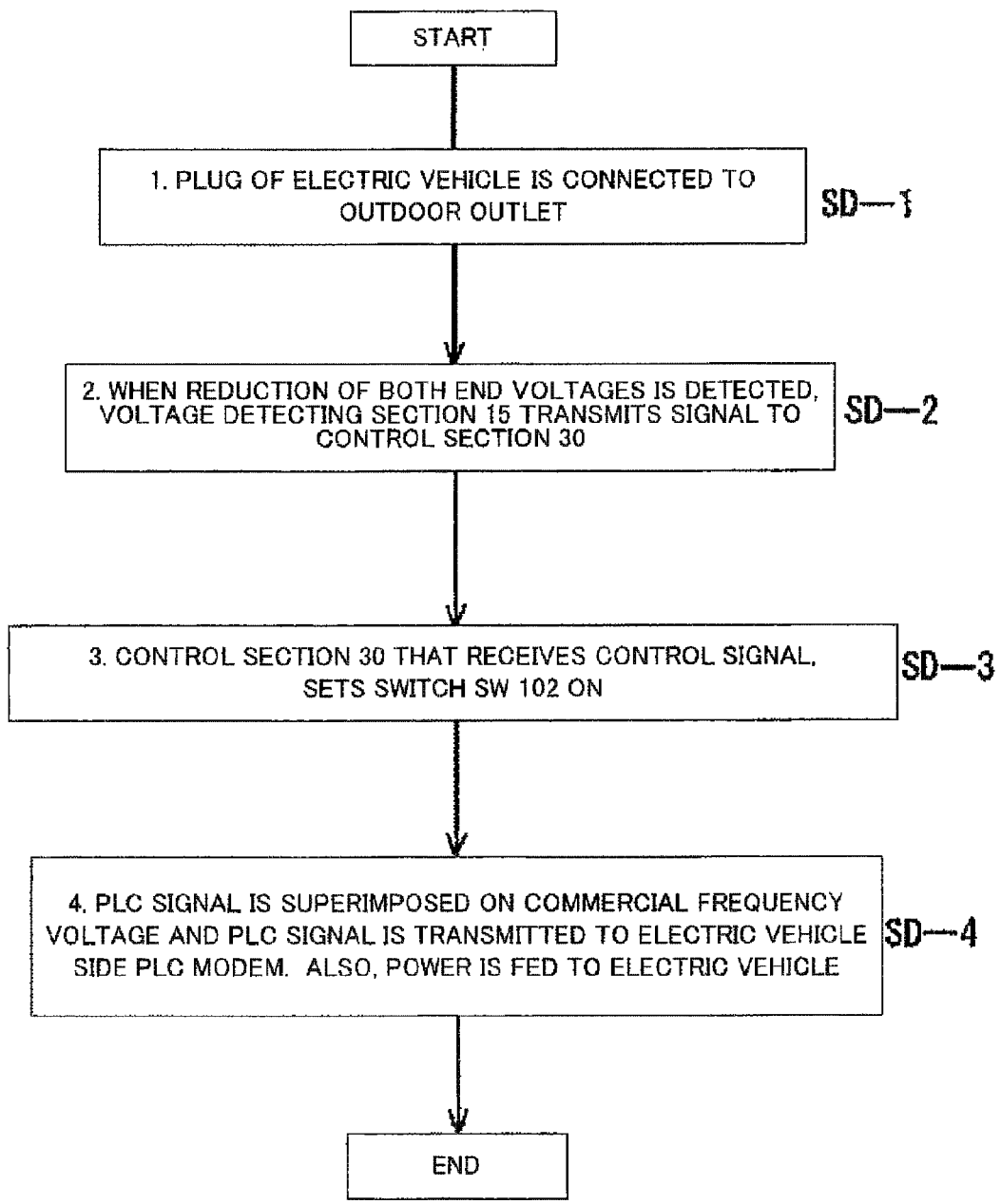
FIG. 8 is flowchart showing an example of the processing carried out by the power supply apparatus shown in FIG. 7.

FIG. 8 is a flowchart showing an example of the processing performed by power supply apparatus 1 shown in FIG. 7. Note that the PLC modem shown in FIG. 8 means the aforementioned power line communication apparatus.

Further, step SD-1 shown in FIG. 8 is similar to that of step SA-1 shown in FIG. 2, and therefore explanation thereof is omitted.

Next, in FIG. 8, if voltage detecting section 15 detects a variation (reduction) of the both end voltages of outdoor connecting section 11, power line communication apparatus (PLC) 20 and control section 30 are notified of a detected signal by voltage detecting section 15 (step SD-2).

Although not shown in FIG. 8, external equipment is notified of the connection of the load (equipment) via the network, by power line communication apparatus (PLC) 20 that receives the control signal.

Then, control section 30 that receives the control signal, controls the passage of the power by the power supplying section 14, and allows the power to pass by turning-on switch SW 102 of the power supplying section (step SD-3).

Step SD-4 shown in FIG. 8 is the same as step SC-6 shown in FIG. 6, and therefore explanation thereof is omitted.

(Embodiment 5)

Embodiment 5 will be described next, with reference to FIG. 9 and FIG. 10.

(Structure 5)

The structure of power supply apparatus 1 according to this embodiment will be described, with reference to FIG. 9. FIG. 9 is a block diagram showing an example of the power supply apparatus 1. Power supply apparatus 1 is constituted of power receiving section 10, outdoor connecting section 11, power supply limiting section 12, power supplying section 14, voltage detecting section 15, power line communication apparatus (PLC) 20 including communicating section 21 and authenticating section 22, control section 30, and storage section (server) 40.

Note that power receiving section 10, outdoor connecting section 11, power supply limiting section 12, power supplying section 14, voltage detecting section 15, power line communication apparatus (PLC) 20, communicating section 21, authenticating section 22, and control section 30 are similar to those of aforementioned embodiment 4, and therefore explanation thereof is omitted.

Figure 9:
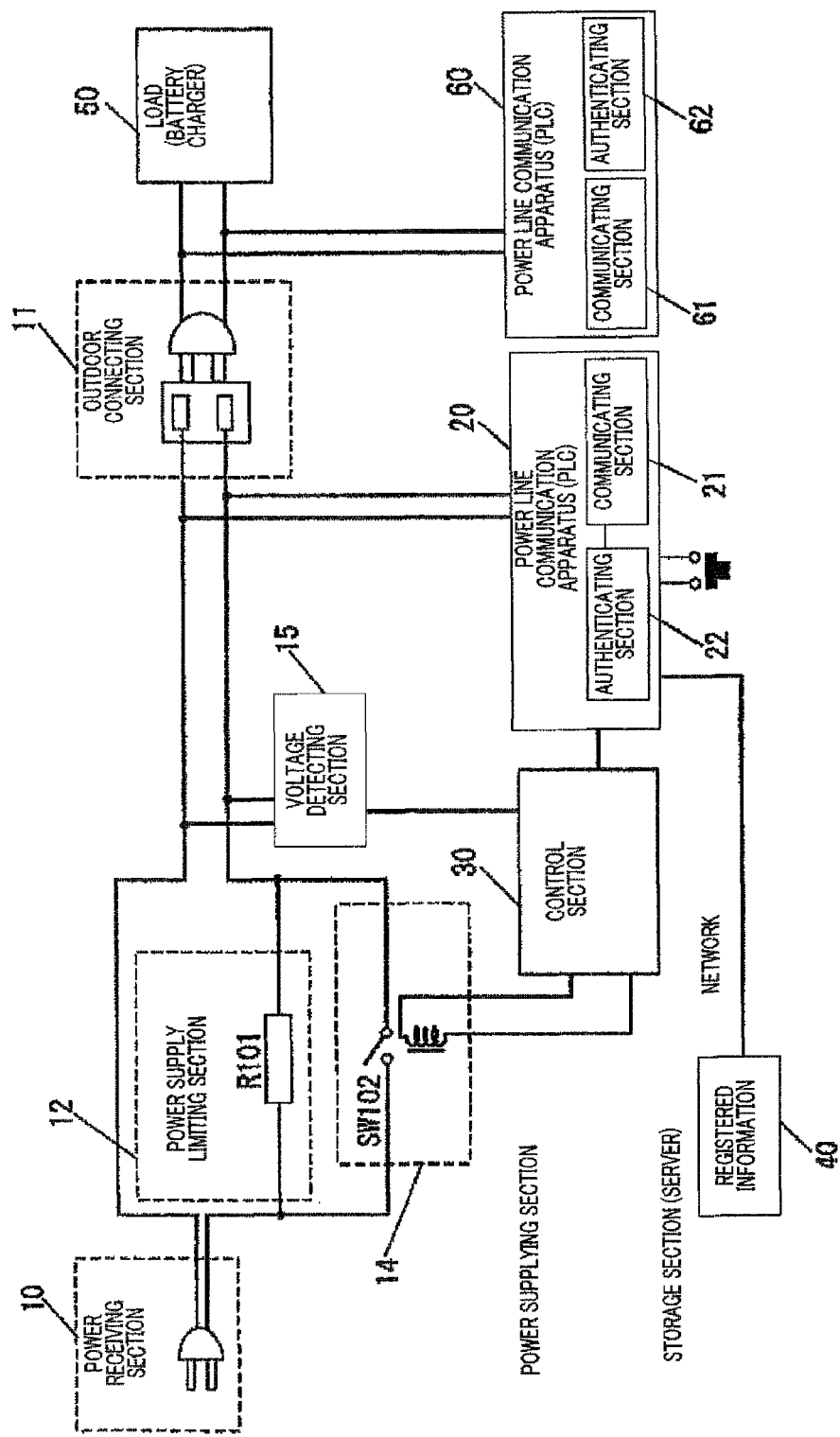
FIG. 9 is a block diagram showing an example of the power supply apparatus according to embodiment 5.

In FIG. 9, authenticating section 22 performs power line communication with second power line communication apparatus (PLC) 60 of the external equipment (for example, electric vehicle) connected to the outdoor connecting section 11, and applies authentication processing thereto to see whether identification information from the second power line communicating section corresponds to the registered information of the external equipment stored in power supply apparatus 1 or storage section (server) 40, and, in case identification information from the second power line communicating section corresponds to the registered information, authenticating section 22 transmits to the control section 30 the control signal that allows the power to pass by power supplying section 14.

Storage section (server) 40 stores the registered information of the external equipment. Wherein, each kind of database and table stored in storage section (server) 40 is stored in a storage section such as a fixed disc apparatus. For example, storage section (server) 40 may also store the registered information for identifying the external equipment including load (battery charger) 50 connected to outdoor connecting section 11, and second power line communication apparatus (PLC) 60 including communicating section 61 and authenticating section 62.

Further, storage section 40 may be storage cells arranged in power supply apparatus 1 or power line communication apparatus (PLC) 20.

(Processing 5)

Figure 10:
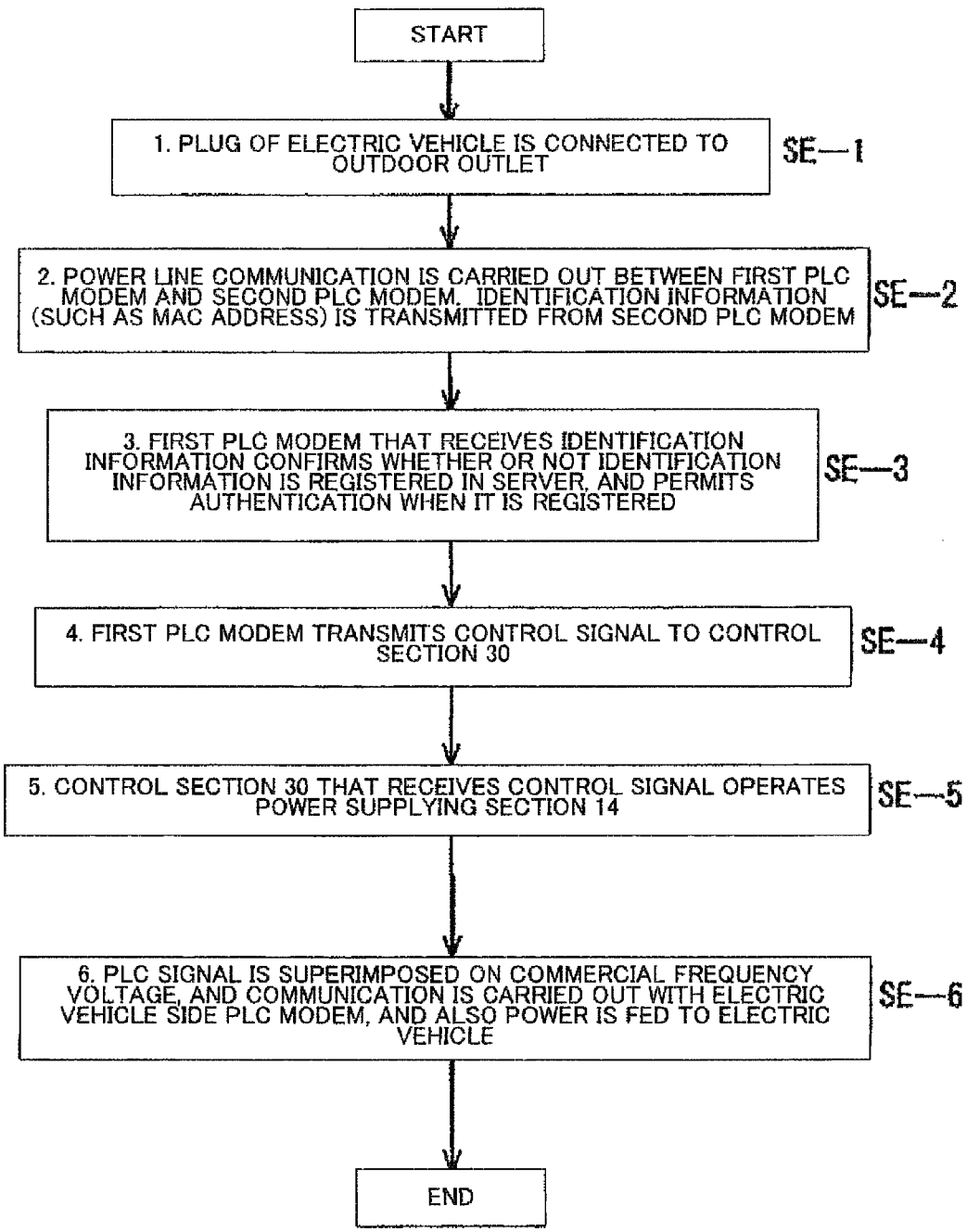
FIG. 10 is a flowchart showing an example of the processing carried out by the power supply apparatus shown in FIG. 9.

FIG. 10 is a flowchart showing an example of the processing performed by power supply apparatus 1 shown in FIG. 9. Note that the PLC modem shown in FIG. 10 means the aforementioned power line communication apparatus.

Further, step SE-1 shown in FIG. 10 is the same as step SA-1 shown in FIG. 2, and therefore explanation thereof is omitted.

Next, as shown in FIG. 10, first power line communication apparatus (PLC) 20 performs power line communication with second power line communication apparatus (PLC) 60 of the electric vehicle, and transmits identification information (for example, MAC address) from second power line communication apparatus (PLC) 60 (step SE-2).

Then, authenticating section 22 of first power line communication apparatus (PLC) 20 that receives the identification information, confirms (namely, authenticates) whether or not the identification information is registered in the server (storage section 40), and, if the identification information from second power line communication apparatus (PLC) 60 corresponds to the registered information, authenticating section 22 permits authentication (step SE-3).

Then, if authentication is permitted by step SE-3, first power line communication apparatus (PLC) 20 transmits to the control section 30 the control signal that allows the power to pass by power supplying section (power supply limitation invalidating section) 14 (step SE-4).

Step SE-5 to step SE-6 shown in FIG. 10 are the same as step SD-3 to step SD-4 shown in FIG. 8, and therefore explanation thereof is omitted.

(Embodiment 6)

Embodiment 6 will be described next, with reference to FIG. 11, and FIG. 12 to FIG. 14.

(Structure 6)

Figure 11:
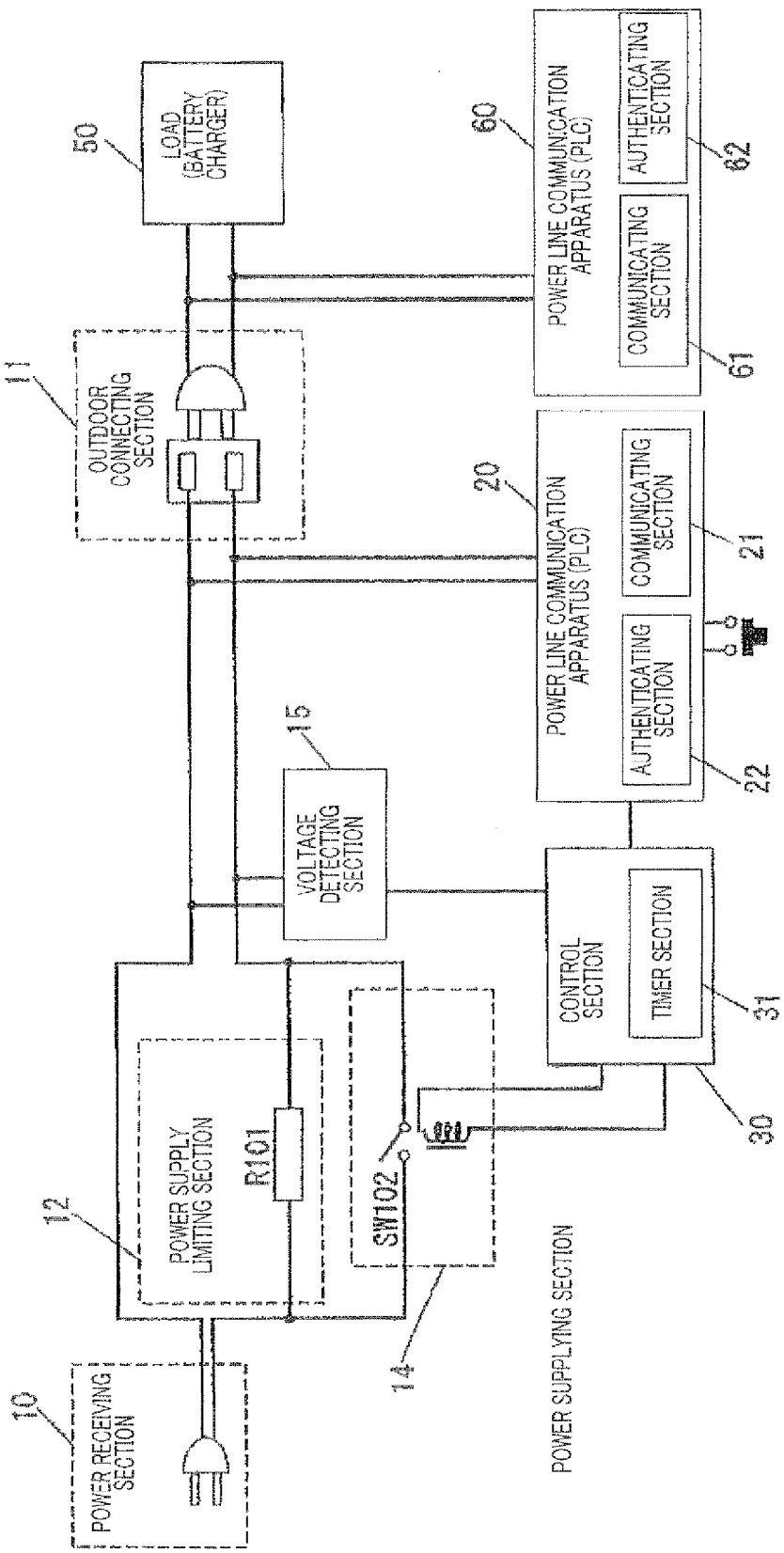
FIG. 11 is a block diagram showing an example of the power supply apparatus according to embodiment 6.

The structure of power supply apparatus 1 of this embodiment will be described with reference to FIG. 11. FIG. 11 is a block diagram showing an example of power supply apparatus 1. Power supply apparatus 1 is constituted of power receiving section 10, outdoor connecting section 11, power supply control section 12, power supplying section 14, voltage detecting section 15, power line communication apparatus (PLC) 20 including communicating section 21 and authenticating section 22, and control section 30 including timer section 31.

Note that power receiving section 10, outdoor connecting section 11, power supply control section 12, power supplying section 14, voltage detecting section 15, power line communication apparatus (PLC) 20, communicating section 21, authenticating section 22, and control section 30 are similar to those of aforementioned embodiment 4 and embodiment 5, and therefore explanation thereof is omitted.

In FIG. 11, control section 30 includes timer section 31. Wherein, if the control signal is received from voltage detecting section 15, timer section 31 allows the power to pass by power supplying section 14 for a prescribed time.

(Processing 6)

Figure 12:
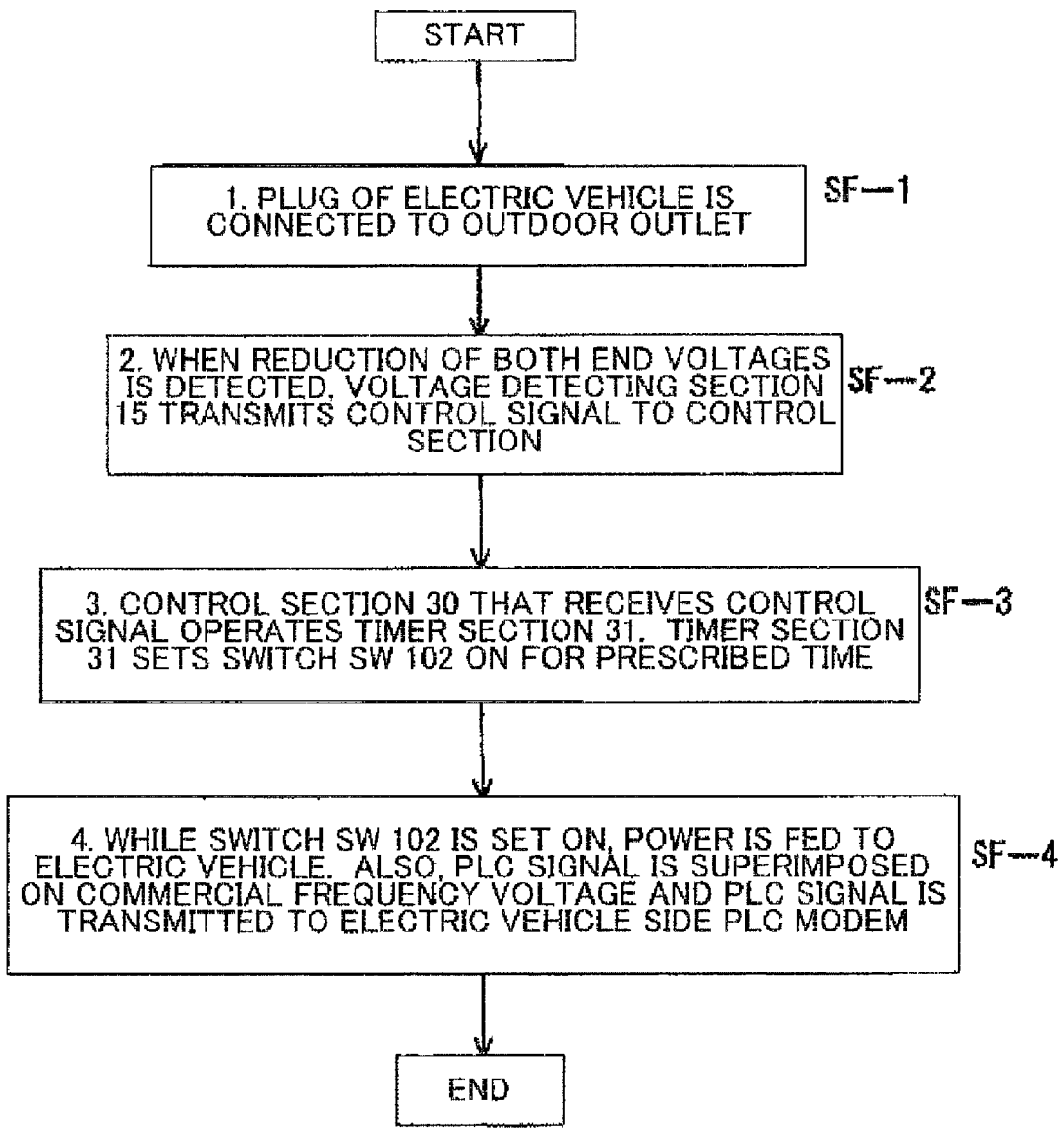
FIG. 12 is a flowchart showing an example of the processing carried out by the power supply apparatus shown in FIG. 11.

FIG. 12 is a flowchart showing an example of the processing performed by power supply apparatus 1 shown in FIG. 11. Note that the PLC modem shown in FIG. 12 means the aforementioned power line communication apparatus.

Further, SF-1 shown in FIG. 12 is the same as step SA-1 shown in FIG. 2, and therefore explanation thereof is omitted.

Next, as shown in FIG. 12, if the reduction of the both end voltages of outdoor connecting section 11 is detected, voltage detecting section 15 transmits to control section 30 the control signal that allows the power to pass by power supplying section 14 (step SF-2).

Then, timer section 31 is operated by control section 30 that receives the control signal. Timer 31 allows passing of power by turning on switch SW 102 of the relay of power supply section 14 for a prescribed time (step SF-3).

Then, outdoor connecting section 11 transmits the PLC signal which is superimposed on the voltage of the commercial power by power line communication apparatus (PLC) 20, to the electric vehicle side second power line communication apparatus (PLC) 60, and also performs power feeding to the electric vehicle by transmitting the currents of the commercial power in a period while switch SW 102 is turned-on, namely for a prescribed time.

(Processing 7)

Figure 13:
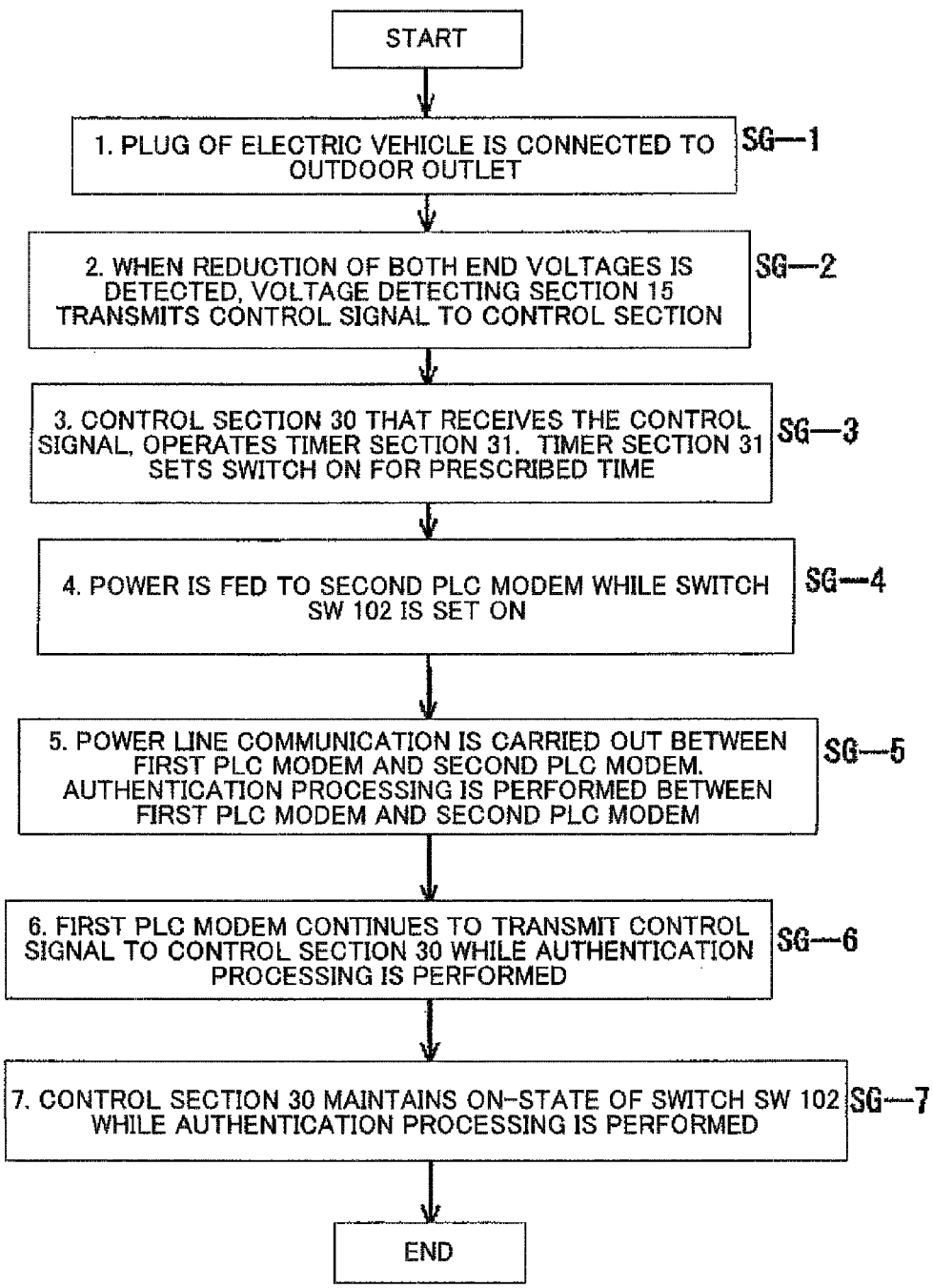
FIG. 13 is a flowchart showing an example of the processing carried out by the power supply apparatus shown in FIG. 11.

FIG. 13 is a flowchart showing an example of the processing performed by power supply apparatus 1 shown in FIG. 11. Note that the PLC modem shown in FIG. 13 means the aforementioned power line communication apparatus.

Further, steps SG-1 to SG-3 shown in FIG. 13 are the same as steps SF-1 to step SF-3 shown in FIG. 12, and therefore explanation thereof is omitted.

Next, as shown in FIG. 13, while switch SW 102 is turned-on, outdoor connecting section 11 performs power feeding to load (battery charger) 50 and second power line communication apparatus (PLC) 60 by supplying the currents of the commercial power thereto (step SG-4).

Then, power line communication apparatus (PLC) 20 performs power line communication with second power line communication apparatus (PLC) 60, and authenticating section 22 performs authentication processing to second power line communication apparatus (PLC) 60 (step SG-5).

Then, while being authenticated (namely, if the authentication processing is executed), authenticating section 22 of power line communication apparatus (PLC) 20 continues to transmit to the control section 30 the control signal that allows the power to pass by power supplying section 14 (step SG-6).

Then, while being authenticated (namely, if the authentication processing is executed), control section 30 maintains switch SW 102 of the relay of the power supplying section 14 in the ON state (step SG-7).

(Processing 8)

Figure 14:
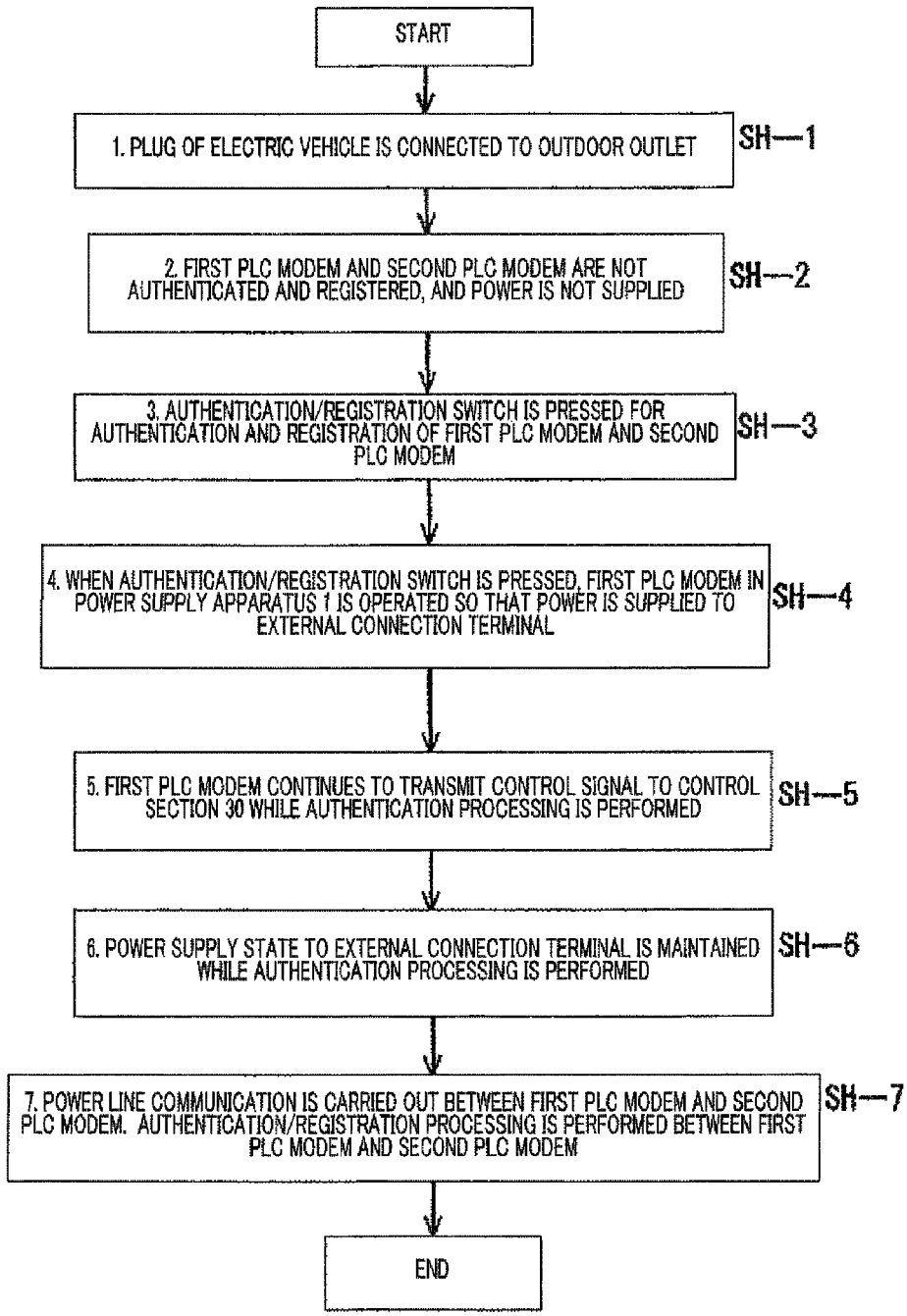
FIG. 14 is a flowchart showing an example of the processing carried out by the power supply apparatus shown in FIG. 11.

FIG. 14 is a flowchart showing an example of the processing performed by power supply apparatus 1 shown in FIG. 11. Note that the PLC modem shown in FIG. 14 means the aforementioned power line communication apparatus.

Further, step SH-1 shown in FIG. 14 is the same as step SG-1 shown in FIG. 13, and therefore explanation thereof is omitted.

Next, as shown in FIG. 14, the commercial power is not supplied to the load, which is not authenticated, even if it is connected to the outdoor connecting section (step SH-2).

An authentication/registration switch (not shown) is pressed for authentication (step SH-3).

If the authentication/registration switch is pressed, power line communication apparatuses (PLC) 20, 60 start authentication processing, so that supply of the commercial power source is started (step SH-4).

While being authenticated (namely, if the authentication processing is executed), authenticating section 22 of first power line communication apparatus (PLC) 20 continues to transmit to control section 30 the control signal that allows the power to pass by power supplying section 14 (step SH-5).

Then, while being authenticated (namely, if the authentication processing is executed), control section 30 maintains switch SW 102 of power supplying section 14 in the ON state (step SH-6).

Then, the power line communication is carried out between first power line communication apparatus (PLC) 20 and second power line communication apparatus (PLC) 60, and the authentication/registration processing is executed (step SH-7).

(Embodiment 7)

Next, embodiment 7 will be described hereinafter, with reference to FIG. 15 and FIG. 16.

(Structure 7)

The structure of power supply apparatus 1 according to this embodiment will be described, with reference to FIG. 15. FIG. 15 is a block diagram showing an example of power supply apparatus 1. Power supply apparatus 1 is constituted of power receiving section 10, outdoor connecting section 11, power supply control section 12, power supplying section 14, voltage detecting section 15 for outputting a starting signal to power line communication apparatus (PLC) 20, power line communication apparatus (PLC) 20 including communicating section 21 and authenticating section 22, which is connected to voltage detecting section 15 and an operation of which is controlled by the starting signal, and control section 30 including timer section 31.

Power line communication apparatus (PLC) 20 is configured to control operation or stop of a part or an entire part of the power line communication apparatus (PLC) 20, by the starting signal outputted from voltage detecting section 15.

Note that power receiving section 10, outdoor connecting section 11, power supply control section 12, power supplying section 14, voltage detecting section 15, power line communication apparatus (PLC) 20, communicating section 21, authenticating section 22, control section 30, timer section 31 are similar to those of aforementioned embodiment 6, and therefore explanation thereof is omitted.

(Processing 9)

Figure 15:
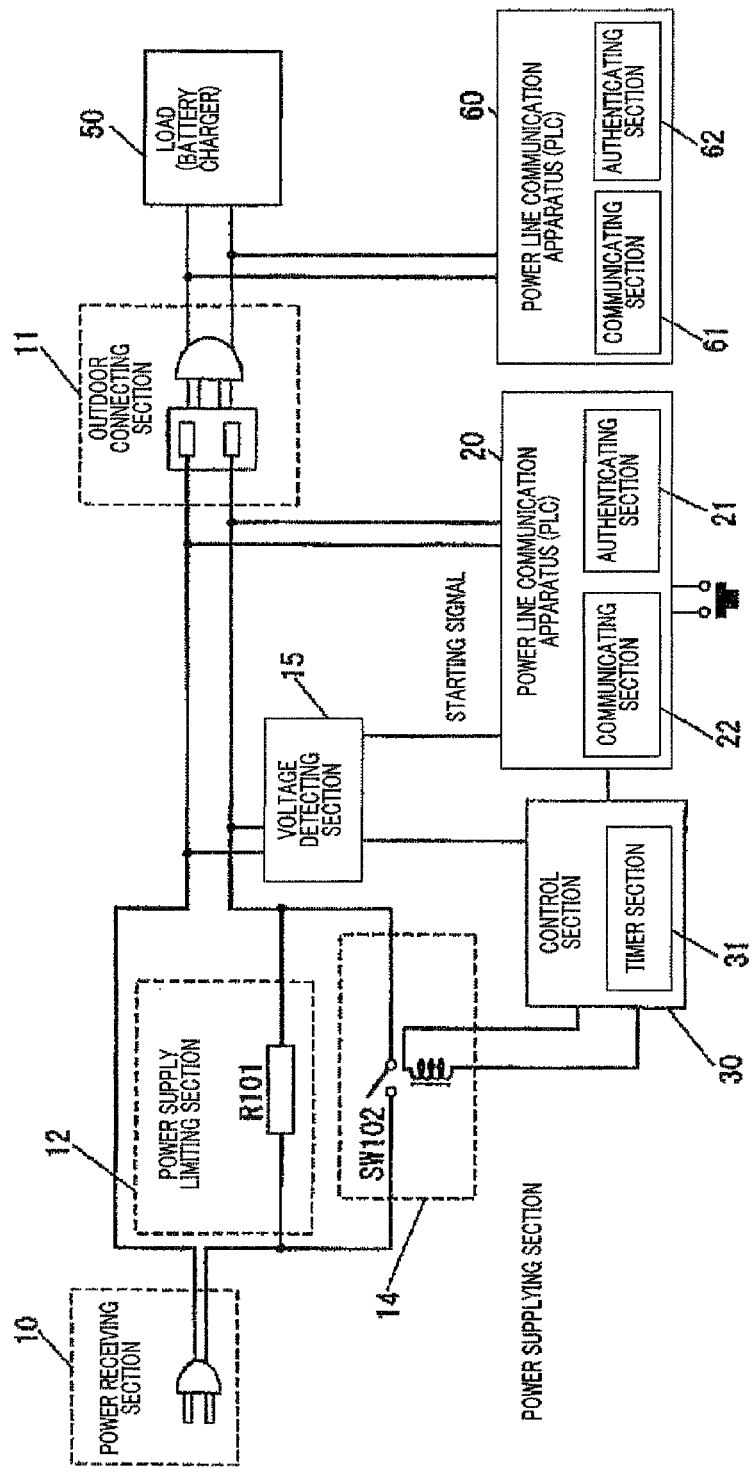
FIG. 15 is a flowchart showing an example of the processing carried out by the power supply apparatus shown in FIG. 7.
Figure 16:
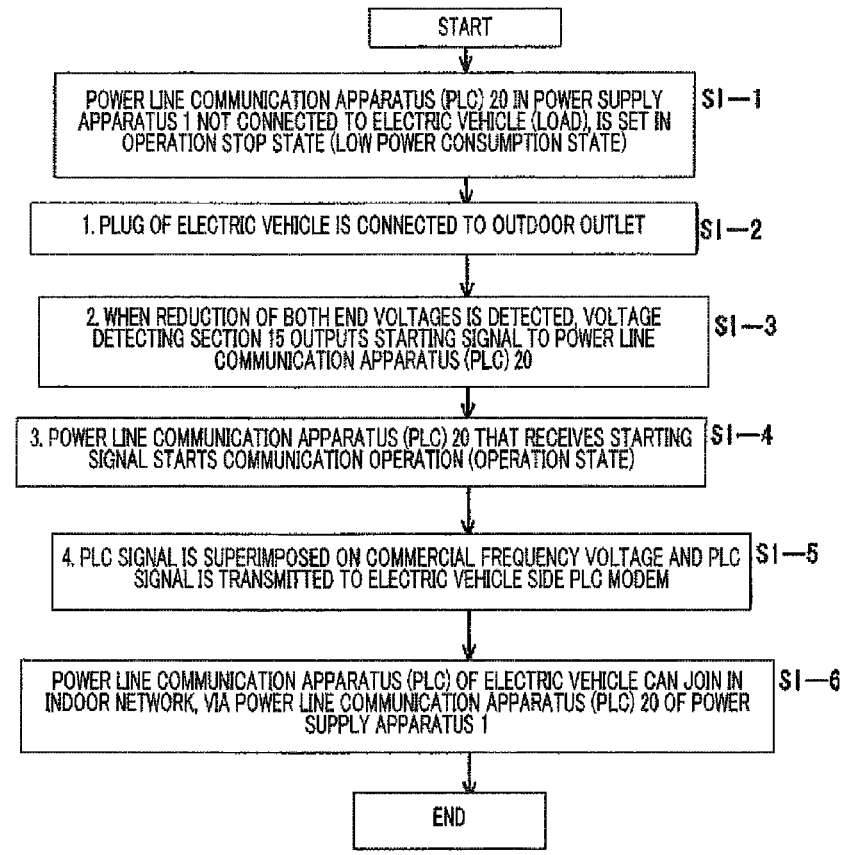
FIG. 16 is a flowchart showing an example of the processing carried out by the power supply apparatus shown in FIG. 15.
Figure 16:
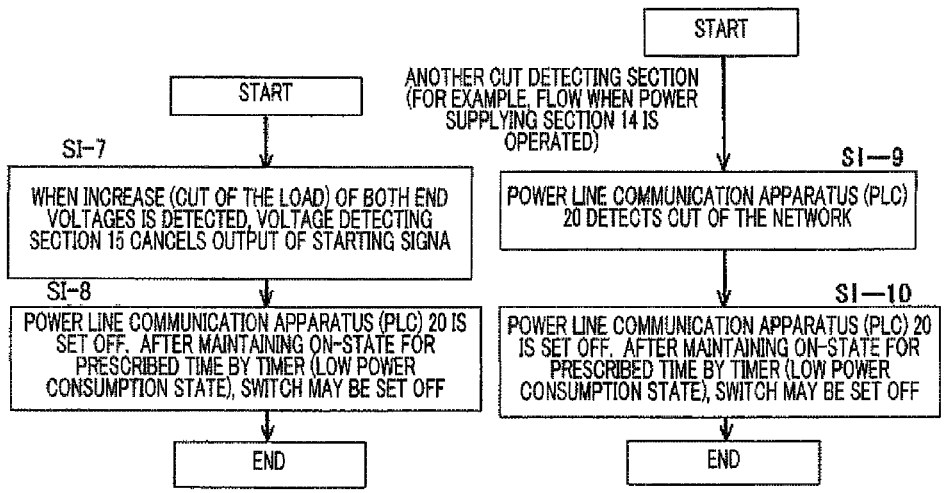

FIG. 16 is a flowchart showing an example of the processing performed by power supply apparatus 1 shown in FIG. 15. Note that the PLC modem shown in FIG. 16 means the aforementioned power line communication apparatus.

First, the load (battery charger) is not connected to outdoor connecting section 11, and if the load (battery charger) is not connected to outdoor connecting section 11, there is a small drop of the voltage of the outdoor connection terminal in the power supply control section 12, and the voltage detecting section detects an unconnected state of the toad (battery charger), and the starting signal is not outputted (step SI-1).

Then, since the starting signal is not outputted, the operation of power line communication apparatus (PLC) 20 is stopped, thus showing zero or an extremely small, value as power consumption. If the load (battery charger) is connected to outdoor connecting section 11 (step SI-2), and an output voltage of outdoor connecting section 11 is decreased, an equipment connection state is detected by voltage detecting section 15, and the starting signal is outputted to power line communication apparatus (PLC) 20 by voltage detecting section 15 (step SI-3).

Then, power line communication apparatus (PLC) 20 starts the operation and performs communication with second power line communication apparatus (PLC) 60 mounted on the electric vehicle (step SI-4).

Then, first and second power line communication apparatuses (PLC) 20, 60 carry out communication (step SI-5).

Then, second power line communication apparatus (PLC) 60 can join in the indoor network via power line communication apparatus (PLC) 20 (step SI-6).

Further, if the load is cut from the outdoor connecting section 11, power supply section 14 is operated as follows.

First, if the load is cut and an output voltage of outdoor connecting section 11 is raised, a cut state of the equipment is detected by voltage detecting section 15, and the starting signal is stopped by voltage detecting section 15 (step SI-7).

Then, if the starting signal is stopped, power line communication apparatus (PLC) 20 stops the operation, thereby showing zero or an extremely small value of the power consumption (step S1-8).

Further, a power source may be set in the OFF-state after the power source is maintained in the ON state for a prescribed time by the timer section 31.

Thus, by providing voltage detecting section 15 and controlling power line communication apparatus (PLC) 20, the power consumption during being unconnected to the electric vehicle (load, equipment) can be reduced, and an operation cost can be reduced.

Further, in processing 9, explanation is given on the assumption that power supply apparatus 1 does not include power supplying section 14. However, if power supply apparatus 1 includes power supplying section 14, thereby permitting power supply, the output voltage of outdoor connecting section 11 is not decreased even if cutting the load (equipment) connected to outdoor connecting section 11. Therefore, voltage detecting section 15 cannot detect the cut of the load (equipment), and power line communication apparatus (PLC) 20 continues to be operated. In this case, the cut of the network is detected by cutting the power line communication between power line communication apparatus (PLC) 20 and the second power line communication apparatus (PLC) 60 (step SI-9).

If the cut of the network is detected, power line communication apparatus (PLC) 20 stops its operation. At this time, the operation may be stopped after the operation state is maintained by the timer for a prescribed time (step SI-10).

Further, the operation of power line communication apparatus (PLC) 20 is described above, and the operation of power supplying section 14 can also be controlled similarly to the operation of the power line communication apparatus (PLC) 20.

With this structure, economical power supply apparatus 1 with standby power reduced, can be constructed.

(Embodiment 8)

Embodiment 8 will be described next, with reference to FIG. 17 and FIG. 18.

(Structure 8)

The structure of power supply apparatus 1 according to this embodiment will be described, with reference to FIG. 17. FIG. 17 is a block diagram showing an example of power supply apparatus 1. Power supply apparatus 1 is constituted of power receiving section 10, outdoor connecting section 11, power supply limiting section 12, power supplying section 14, voltage detecting section 15, power line communication apparatus (PLC) 20 including communicating section 21 and authenticating section 22, and control section 30 including timer section 31 communicably connected to network apparatus 70 via the network and network terminal section 32.

Note that power receiving section 10, outdoor connecting section 11, power supply limiting section 12, power supplying section 14, voltage detecting section 15, power line communication apparatus (PLC) 20, communicating section 21, authenticating section 22, control section 30, and timer section 31 are similar to those of aforementioned embodiment 6, and therefore explanation thereof is omitted.

Figure 17:
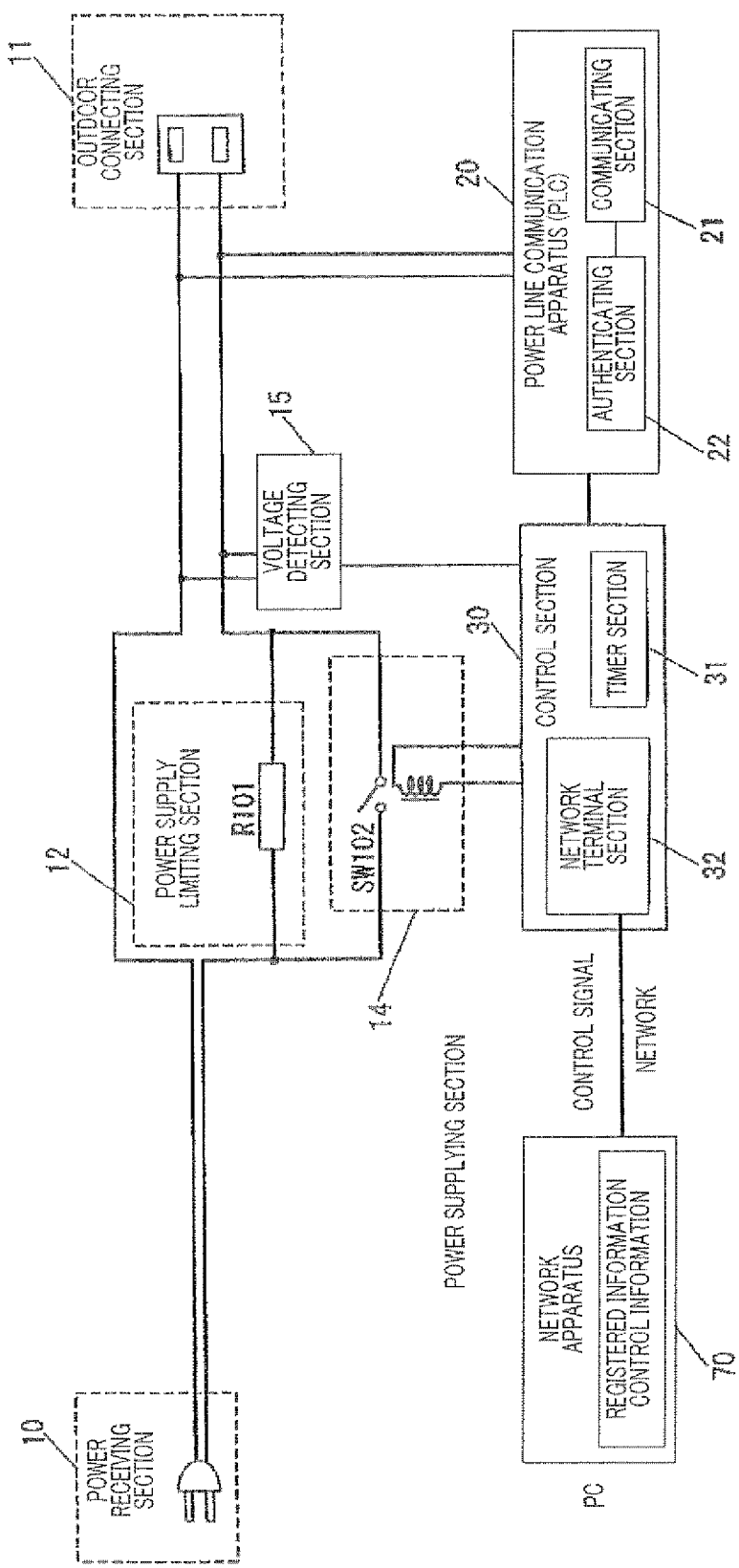
FIG. 17 is a block diagram showing an example of the power supply apparatus according to embodiment 8.

In FIG. 17, control section 30 further includes network terminal section 32. Then, network terminal section 32 receives the registered information and the control signal used for the authentication processing performed by authenticating section 22, from network apparatus (PC) 70 that stores at least registered information of the external equipment and control information including the control signal that allows the power to pass by power supplying section 14.

(Processing 10)

Figure 18:
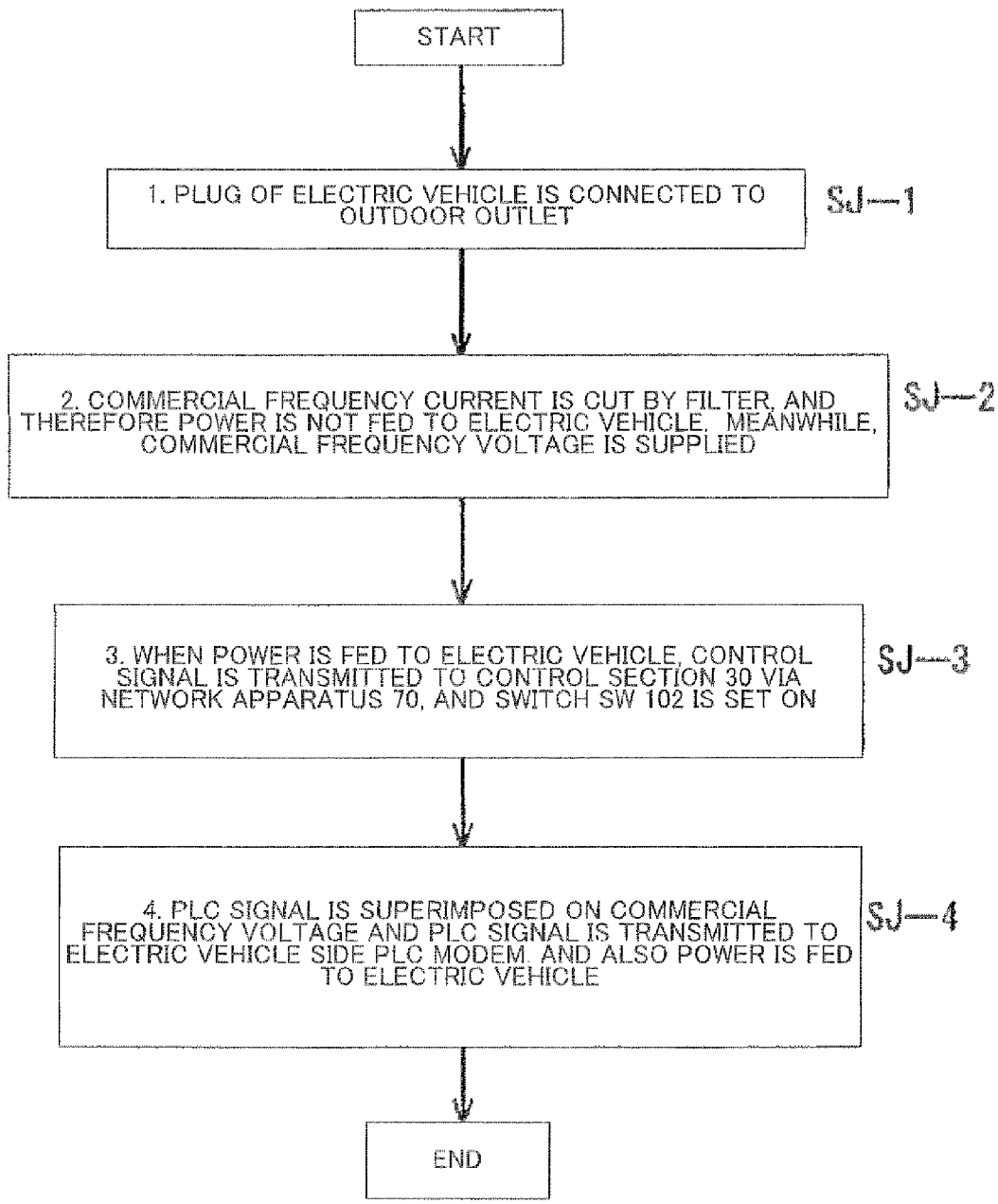
FIG. 18 is a flowchart showing an example of the processing carried out by the power supply apparatus shown in FIG. 17.

FIG. 18 is a flowchart showing an example of the processing performed by power supply apparatus 1 shown in FIG. 17. Note that the PLC modem shown in FIG. 18 means the aforementioned power line communication apparatus.

Further, step SJ-1 to step SJ-2 shown in FIG. 18 are the same as step SA-1 to step SA-2 shown in FIG. 2, and therefore explanation thereof is omitted.

If power feeding is performed to the electric vehicle by a user of network apparatus 70 which is communicably connected to control section 30 via the network, the control signal that allows the power to pass by power supplying section 14 is transmitted to control section 30 by network apparatus 70, and if the control signal is received by network terminal section 32, control section 30 allows the power to pass by turning-on switch SW 102 of power supplying section 14 (step SJ-3).

Step SJ-4 shown in FIG. 18 is the same as step SC-6 shown in FIG. 6, and therefore explanation thereof is omitted.

(Embodiment 9)

Figure 19:
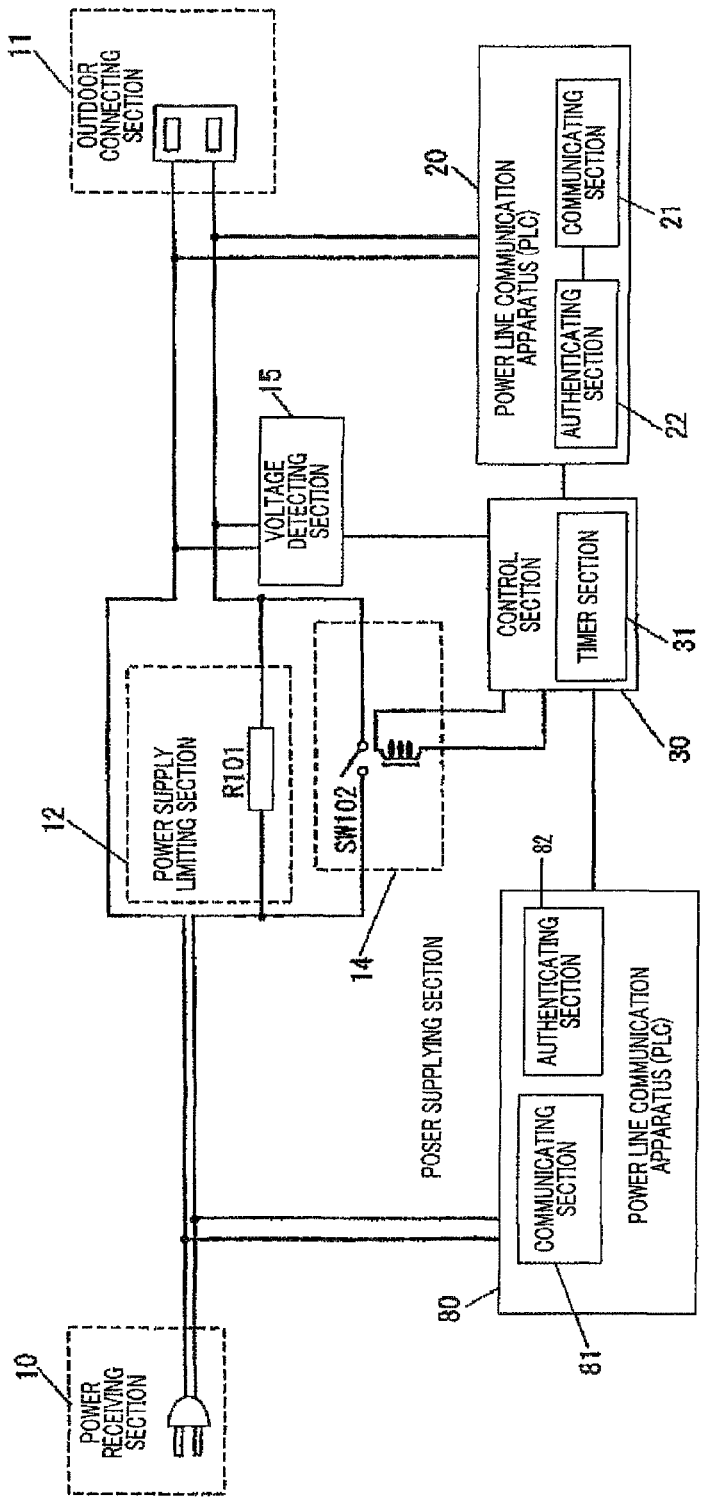
FIG. 19 is a block diagram showing an example of the power supply apparatus according to embodiment 9.

Embodiment 9 will be described next, with reference to FIG. 19.

(Structure 9)

The structure of power supply apparatus 1 of this embodiment will be described, with reference to FIG. 19. FIG. 19 is a block diagram showing an example of power supply apparatus 1. Power supply apparatus 1 is constituted of power receiving section 10, outdoor connecting section 11, power supply limiting section 12, power supplying section 14, voltage detecting section 15, power line communication apparatus (PLC) 20 including communicating section 21 and authenticating section 22, and control section 30 including timer section 31 connected to power line communication apparatus (PLC) 80 via the power line.

Note that power receiving section 10, outdoor connecting section 11, power supply limiting section 12, power supplying section 14, voltage detecting section 15, power line communication apparatus (PLC) 20, communicating section 21, authenticating section 22, control section 30, and timer section 31 are similar to those of aforementioned embodiment 6, and therefore explanation thereof is omitted.

Power line communication apparatus (PLC) 20 performs communication with power line communication apparatus (PLC) 80 that exists on the indoor power line network, and operates power supplying section 14 based on authentication data or permission data possessed by power line communication apparatus (PLC) 80 or obtained via the power line communication apparatus (PLC) 80, and outputs to control section 30 (timer section 31) the control signal for supplying power to outdoor connecting section 11.

(Embodiment 10)

Figure 20:
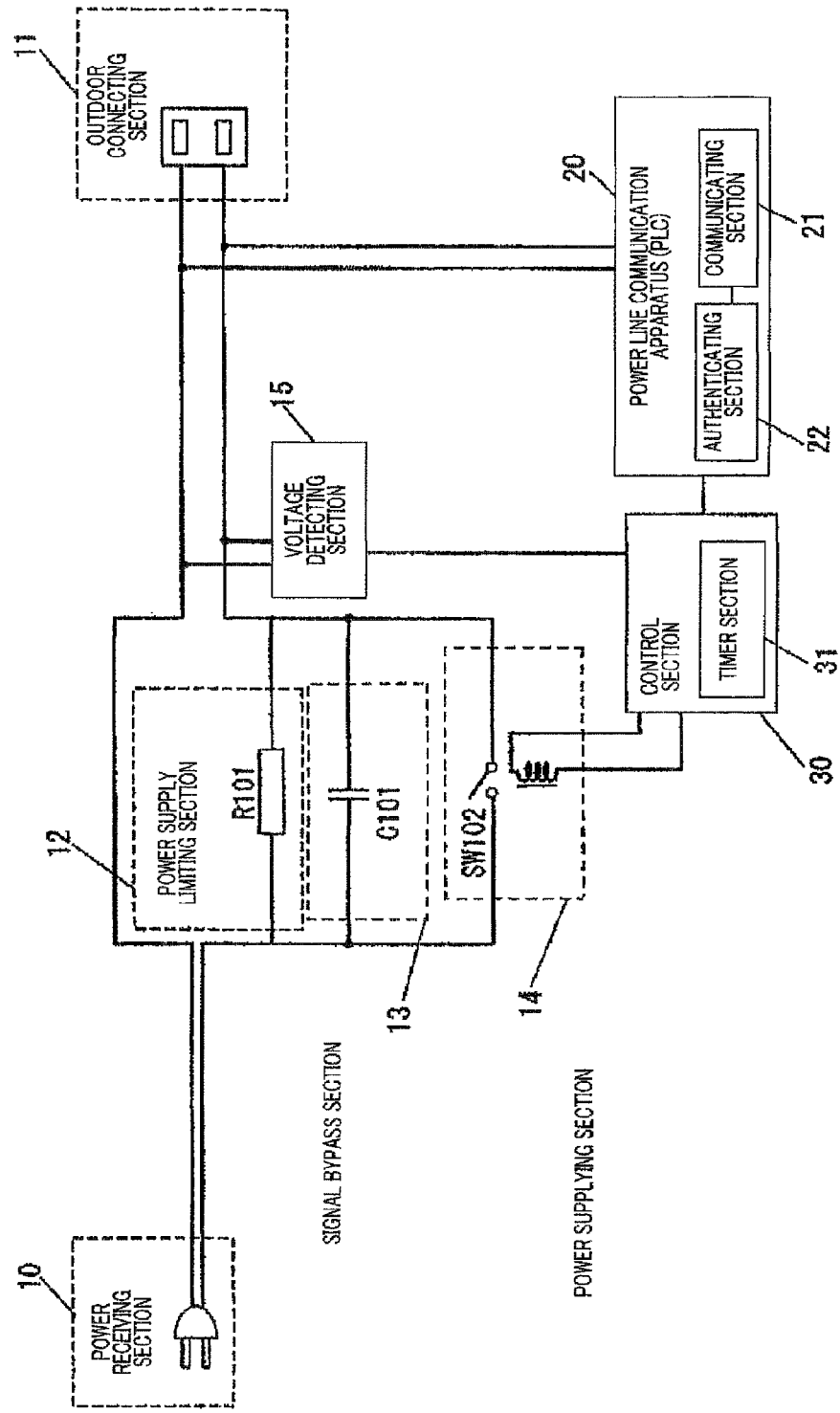
FIG. 20 is a block diagram showing an example of the power supply apparatus according to embodiment 10.

Embodiment 10 will be described next, with reference to FIG. 20.

(Structure 10)

The structure of power supply apparatus 1 of this embodiment will be described, with reference to FIG. 20. FIG. 20 is a block diagram showing an example of power supply apparatus 1. Power supply apparatus 1 is constituted of power receiving section 10, outdoor connecting section 11, power supply limiting section 12, signal bypass section 13, power supplying section 14, voltage detecting section 15, power line communication apparatus (PLC) 20 including communicating section 21 and authenticating section 22, and control section 30 including timer section 31. Note that portions overlapped on the aforementioned explanation are omitted in the description of this structure.

Note that signal bypass section 13 is similar to that of aforementioned embodiment 2. Also, power receiving section 10, outdoor connecting section 11, power supply limiting section 12, power supplying section 14, voltage detecting section 15, power line communication apparatus (PLC) 20, communicating section 21, authenticating section. 22, control section 30, and timer section 31 are similar to those of aforementioned embodiment 6, and therefore explanation thereof is omitted.

Subsequently, an example of applying the aforementioned power supply apparatus 1 will be described, with reference to FIG. 21 to FIG. 23.

Example 1

Residential Exterior Installed Power Supply Apparatus

Figure 21:
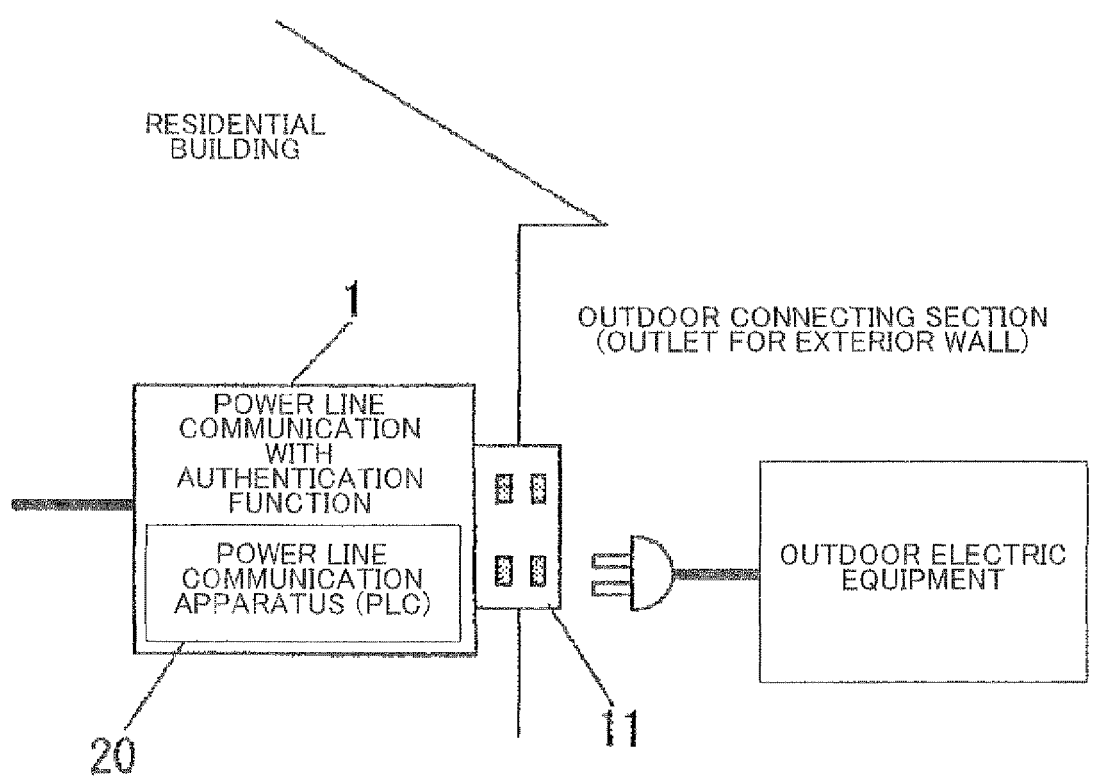
FIG. 21 is a conceptual view showing an example of a structure of the power supply apparatus according to an example.

FIG. 21 shows an example of the structure of power supply apparatus 1.

Power outlets for supplying power are sometimes provided on an exterior wall of a residential building, for using electric equipment outdoors, as a home-use or business-use. Such power outlets are usually left in a power supplied state. However, there is a problem that a third person can easily use this power at night or during absence, and therefore an owner suffers an economic loss or the equipment or a power feeding facility is broken by connecting unintended equipment thereto, or protective equipment is operated in some cases.

As shown in FIG. 21, in power supply apparatus 1 having power line communication apparatus (PLC) 20 assembled therein, outdoor connecting section 11 is installed as an exterior wall outlet, in a communicable state with an attachment plug of the outdoor electric equipment.

Thus, if the outdoor electric equipment is connected to power supply apparatus 1 provided in a residential exterior, a possessor of the power supply apparatus 1 can recognize (for example authenticate) the equipment, and power can be supplied only to the specific equipment, and further unauthorized use (for example, power stealing) by a third person can be prevented and an accident can also be prevented from occurring.

Example 2

Information Terminal Apparatus

Figure 22:
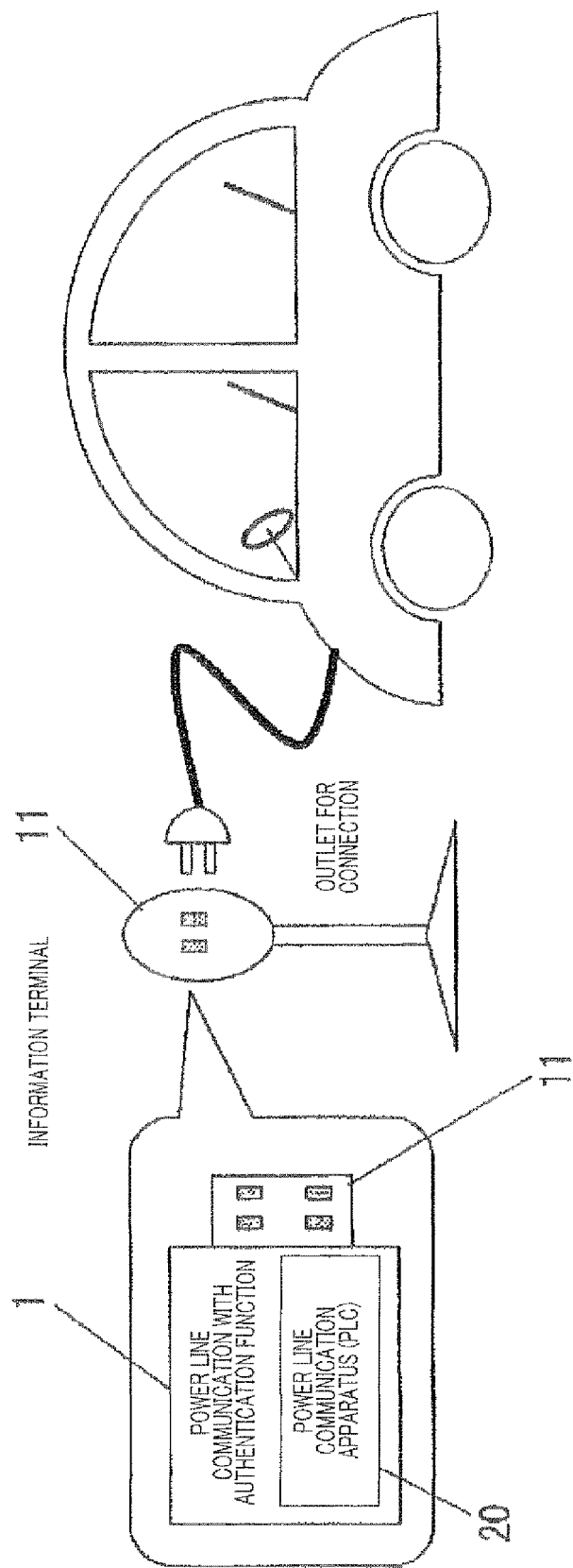
FIG. 22 is a conceptual view showing an example of a structure of the power supply apparatus according to an example.

FIG. 22 shows an example of the structure of power supply apparatus 1.

If information is provided to many and unspecified third persons, and personal information of an individual who receives the information is included in the provided information, there is a possibility that security issues is generated in a wireless portion.

Further, if an ordinary power supply terminal is installed, there is a problem such as illegal use of information and illegal use of power like charging.

As shown in FIG. 22, power supply apparatus 1 having power line communication apparatus (PLC) 20 assembled therein, is installed as a connecting outlet of the information terminal (information terminal apparatus), and is set in a communicable state with the attachment plug of the charging cable of the electric vehicle.

Thus, if information is exchanged with the electric vehicle, the information can be exchanged with no leak and hardly suffering damage such as wiretapping.

Further, if power supply apparatus 1 of the present invention is installed, only the information can be provided to an unauthenticated vehicle (user), and the information or power can be easily provided to a registered or permitted vehicle (user).

Example 3

Vehicle Charging Power Supply Apparatus

Figure 23:
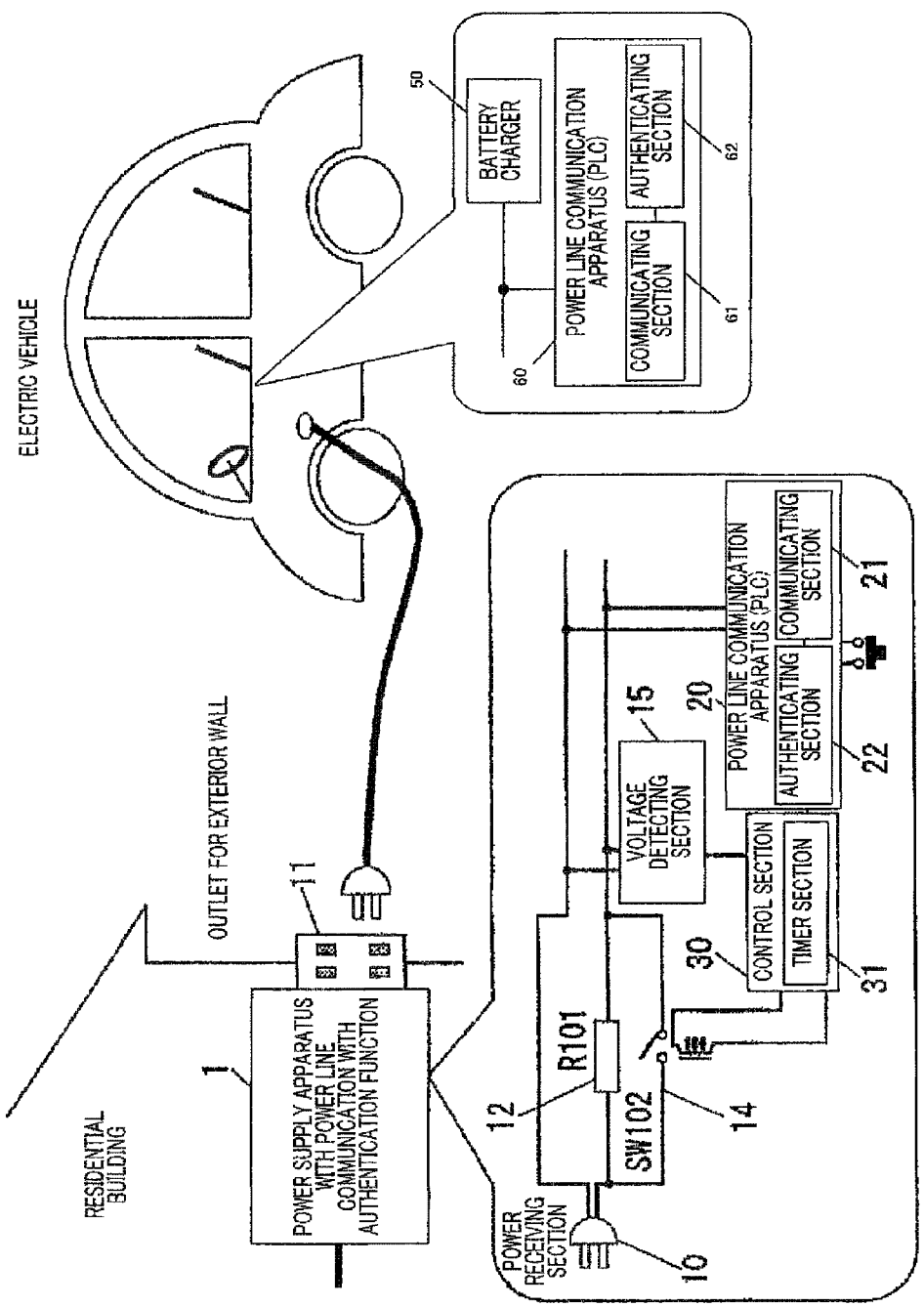
FIG. 23 is a conceptual view showing an example of a structure of the power supply apparatus according to an example.

FIG. 23 shows an example of the structure of power supply apparatus 1.

Development of electric vehicles is promoted from a viewpoint of preventing a global warming, and an increase of an opportunity of providing a power supplying service to the electric vehicles is expected. However, there is a problem that vehicles permitted to be charged cannot be recognized through the charging cable, and accordingly power feeding thereto cannot be performed.

As shown in FIG. 23, power supply apparatus 1 having power line communication apparatus (PLC) 20 assembled therein, outdoor connecting section 11 is installed as the exterior wall outlet, in a communicable state with the attachment plug of the outdoor electric equipment. Thus, power line communication apparatus (PLC) 20 of power supply apparatus 1 can exchange information with second power line communication apparatus (PLC) 60 of the electric vehicle using the power line communication via the charging cable.

Thus, if the electric vehicle is charged, power supply apparatus 1 is capable of authenticating whether the vehicle is permitted to be charged through the charging cable, capable of managing and controlling a charging amount, capable of constructing an integrated network of an in-vehicle network and an indoor network, capable of transferring indoor network data into the vehicle, capable of transferring in-vehicle data to the indoor, and capable of easily supplying power only to an authenticated vehicle by transferring data between power supply apparatus 1 and second power line communication apparatus (PLC) 60 which is mounted on the vehicle.

Embodiments are described above. However, in addition to aforementioned embodiments, variously modified embodiments may be executed within a range of a technical concept not departing from the scope of the claims.

For example, a part or an entire part of the processing described in the embodiments on the assumption that it is automatically performed, can be manually performed, or a part or an entire part of the processing described in the embodiments on the assumption that it is manually performed can be automatically performed.

In addition, a processing procedure, a control procedure, a specific name, registered data of each processing or information including parameters such as retrieving conditions, and a structure of a database, can be arbitrarily changed, unless particularly specified otherwise.

Further, each constitutional element of the power supply apparatus 1 shown in the figure is shown based on a functional concept, and is not necessarily constituted physically as shown in the figure.

For example, a part or an entire part of a processing function of each apparatus of power supply apparatus 1, and particularly each processing function performed by power line communication apparatus (PLC) 20 and control section 30, may be realized by CPU (Central Processing Unit) and by a program interpreted and executed by the CPU.

Further, the "network" means a technique of connecting a plurality of computers by optical fibers, Ethernet (registered trademark), Wireless LAN, Home PNA, etc., and a system in which the plurality of computers are connected. The network includes LAN (Local Area Network), WAN, (Wide Area Network), MAN (Metropolitan Area Network), and. Internet work such as Internet and Intranet, etc.

Further, computer programs may be stored in an application program server connected to power supply apparatus 1 via an arbitrary network, and a part or an entire part of them can be downloaded as needed.

Further, programs of the present invention can also be stored in a computer readable storage medium. Wherein, the "storage media" include arbitrary "portable physical media" such as a flexible disc, an optical magnetic disc, ROM, EPROM, EEPROM, CD-ROM, MO, and DVD, or "communication media" for holding programs in a short term like a communication line or a carrier wave in a case of transmitting the programs via a network represented by LAN, WAN, and Internet.

Further, "program" indicates a data processing method described by an arbitrary language or description method, irrespective of a format such as a source code or a binary code. Note that the "program" is not necessarily uniformly constructed, and there is also a distributed-type program as a plurality of modules or libraries, and a program capable of achieving its function in cooperation with another program represented by OS. Regarding a specific structure, a reading procedure, or an install procedure after reading, for reading a recording medium in each apparatus shown in the embodiments, a publicly-known structure or procedure can be used.

Further, each kind of data base stored in storage section (server) 40, is a memory apparatus such as RAM, ROM, and a fixed disc apparatus such as a hard disc, and a storage section such as a flexible disc and an optical disc, and the database stores each kind of processing and each kind of program, table, and database used for providing website, and files for webpage, etc.

Further, a specific form of the distribution/integration of the apparatus is not limited to the form shown in the figure, and a part or an entire part thereof can be constructed in a distribution type or an integration type functionally or physically by an optional unit, in accordance with each kind of addition or a functional load.

Note that the power supply apparatus according to the present invention may be formed in such a manner as being accommodated in each vehicle body of the electric vehicles or electric motorcycles.

INDUSTRIAL APPLICABILITY

The present invention provides a power supply apparatus capable of supplying power to a specific external apparatus together with a power line communication signal, by controlling supply of currents of a commercial power to external equipment. Therefore, the power supply apparatus of the present invention is useful in various industrial fields such as a power supply field, and particularly, is suitable for a power feeding apparatus that supplies power to electric vehicles.

REFERENCE SIGNS LIST

1 Power supply apparatus (power feeding apparatus)
10 Power receiving section
11 Outdoor connecting section
12 Power supply limiting section
13 Signal bypass section
14 Power supplying section
15 Voltage detecting section
20 Power line communication apparatus
21 Communicating section
22 Authenticating section
23 Network terminal section
30 Control section
31 Timer section
32 Network terminal section
40 Storage section (server)
50 Load (battery charger)
60 Power line communication apparatus (PLC)
61 Communicating section
62 Authenticating section
70 Network apparatus
80 Power line communication apparatus (PLC)
81 Communicating section
82 Authenticating section

The invention claimed is:

1. A power supply apparatus, which supplies power to an equipment via a cable, comprising:
a power receiving section that receives supply of the power from a power line;
a power line communicating section that transmits a communication signal to the equipment via the cable;
a power supply limiting section which is installed between the power receiving section and the equipment, allows the communication signal from the power line communicating section to pass to the equipment, and limits the supply of the power to the equipment;
a power supplying section which is installed between the power receiving section and the equipment and passes the power to the equipment;
a connecting section to which the equipment is connected and which supplies the power to the equipment;
a voltage detecting section that detects a voltage of the connecting section;
a control section that controls passage of the power by the power supplying section, if reduction of the voltage of the connecting section is detected by the voltage detecting section; and a storage section that stores registered information of the equipment;

wherein the power line communicating section performs communication with a second power line communicating section of the equipment, and performs authentication processing whether or not the equipment is registered in the registered information, and transmits a control signal to the control section to enable passage of the power by the power supplying section if identification information from the second power line communicating section corresponds to the registered information.

2. The power supply apparatus according to claim 1, further comprising a signal bypass section which is connected in parallel to the power supply limiting section between the power receiving section and the equipment, limits currents of the power, and allows the communication signal from the power line communicating section to pass to the equipment.

3. The power supply apparatus according to claim 1, wherein the voltage detecting section allows transmission of the control signal from the power line communicating section to the control section if reduction of both end voltages of the connecting section is detected, wherein the control section comprises a timer section that allows passage of the power by the power supplying section for a prescribed time, if the control signal is received.

4. The power supply apparatus according to claim 1, wherein the voltage detecting section allows transmission of the control signal to the control section, if reduction of both end voltages of the connecting section is detected, and cancels transmission of the control signal to the control section, if increase of the both end voltages of the connecting section is detected.

5. The power supply apparatus according to claim 1, wherein the voltage detecting section allows transmission of the control signal to the control section, if reduction of both end voltages of the connecting section is detected, and cancels transmission of the control signal to the control section after elapse of a prescribed time, if increase of the both end voltages of the connecting section is detected.

6. The power supply apparatus according to claim 1, wherein the control section comprises a network terminal section that receives a control signal that allows passage of the power by the power supplying section from a network apparatus communicably connected to the control section via a network.

7. The power supply apparatus according to claim 1, further comprising a third power line communicating section connected to the power receiving section and to the control section, wherein the control section allows passage of the power by the power supplying section from the third power line communicating section via the power line.

8. The power supply apparatus according to claim 1, wherein the connecting section is provided in an exterior wall of a building.

9. The power supply apparatus according to claim 1, wherein the connecting section is provided in an information terminal apparatus.

10. The power supply apparatus according to claim 1, wherein the equipment is an electric vehicle.

* * * * *